US011193517B2

(12) United States Patent
McClure

(10) Patent No.: US 11,193,517 B2
(45) Date of Patent: Dec. 7, 2021

(54) FASTENER SYSTEM

(71) Applicant: Centrix Inc., Kent, WA (US)

(72) Inventor: Travis McClure, Kirkland, WA (US)

(73) Assignee: Centrix Inc., Kent, WA (US)

( * ) Notice: Subject to any disclaimer, the term of this patent is extended or adjusted under 35 U.S.C. 154(b) by 329 days.

(21) Appl. No.: 16/122,462

(22) Filed: Sep. 5, 2018

(65) Prior Publication Data

US 2019/0078600 A1 Mar. 14, 2019

Related U.S. Application Data

(60) Provisional application No. 62/558,762, filed on Sep. 14, 2017.

(51) Int. Cl.
*F16B 5/00* (2006.01)
*F16B 5/02* (2006.01)
*F16B 19/10* (2006.01)
*F16B 13/10* (2006.01)

(52) U.S. Cl.
CPC .......... *F16B 5/0258* (2013.01); *F16B 19/109* (2013.01); *F16B 19/1081* (2013.01); *F16B 2013/10* (2013.01)

(58) Field of Classification Search
CPC .. F16B 5/0258; F16B 19/1081; F16B 19/109; F16B 2013/10; F16B 5/0642; F16B 13/063; F16B 45/06; F16B 13/068; F16B 13/04
USPC ......................................... 411/21, 22, 25, 45
See application file for complete search history.

(56) References Cited

U.S. PATENT DOCUMENTS

| | | |
|---|---|---|
| 1,978,935 A | 10/1934 | Douglas |
| 2,370,336 A | 2/1945 | Wallace |
| 2,379,786 A | 7/1945 | Bugg et al. |
| 2,649,884 A | 8/1953 | Westover |
| 2,775,155 A | 12/1956 | Tompkins et al. |
| 2,936,015 A | 5/1960 | Rapata |
| 2,994,242 A | 8/1961 | Buff et al. |
| 3,469,493 A | 9/1969 | Fisher |
| 4,764,065 A * | 8/1988 | Johnson .................. F16B 13/08 24/625 |
| 5,065,490 A | 11/1991 | Wivagg et al. |
| 5,704,752 A | 1/1998 | Logerot |

(Continued)

FOREIGN PATENT DOCUMENTS

| | | |
|---|---|---|
| EP | 0275160 A2 | 7/1988 |
| GB | 413403 A | 7/1934 |

(Continued)

OTHER PUBLICATIONS

European Patent Office, Extended European Search Report Issued in Application No. 18194425.7, dated Feb. 13, 2019, Germany, 38 pages.

*Primary Examiner* — Jack W Lavinder
(74) *Attorney, Agent, or Firm* — McCoy Russell LLP

(57) ABSTRACT

A fastener system shifting shear stresses away from a collet body and provides clamping action to targeted structures. The fastener system includes feet in the collet body that mate with openings in a sleeve at least partially surrounding the collet body. The sleeve or the collet body includes interior threads that engage with a stud that is configured to extend through the collet body and bend the feet such that they project outward from the sleeve openings in an engaged configuration.

10 Claims, 25 Drawing Sheets

(56) References Cited

U.S. PATENT DOCUMENTS

| | | | |
|---|---|---|---|
| 6,174,118 B1 | 1/2001 | Rebers | |
| 6,287,044 B1 | 9/2001 | Huber | |
| 7,607,875 B2 * | 10/2009 | Shinozaki | F16B 21/078 411/45 |
| 7,993,085 B2 | 8/2011 | McClure | |
| 2002/0144574 A1 | 10/2002 | Avetisian et al. | |
| 2003/0170071 A1 * | 9/2003 | Tsui | B64G 1/641 403/154 |
| 2007/0243037 A1 | 10/2007 | Pratt | |
| 2010/0086376 A1 | 4/2010 | McClure | |

FOREIGN PATENT DOCUMENTS

| | | |
|---|---|---|
| GB | 624714 A | 6/1949 |
| GB | 1548964 A | 7/1979 |
| JP | H1151018 A | 2/1999 |
| WO | 03069971 A2 | 8/2003 |
| WO | 2015130533 A1 | 9/2015 |

\* cited by examiner

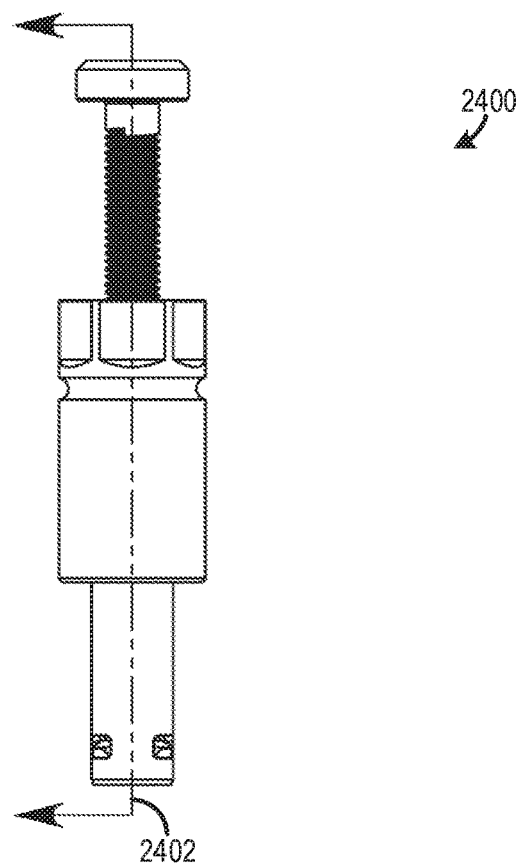
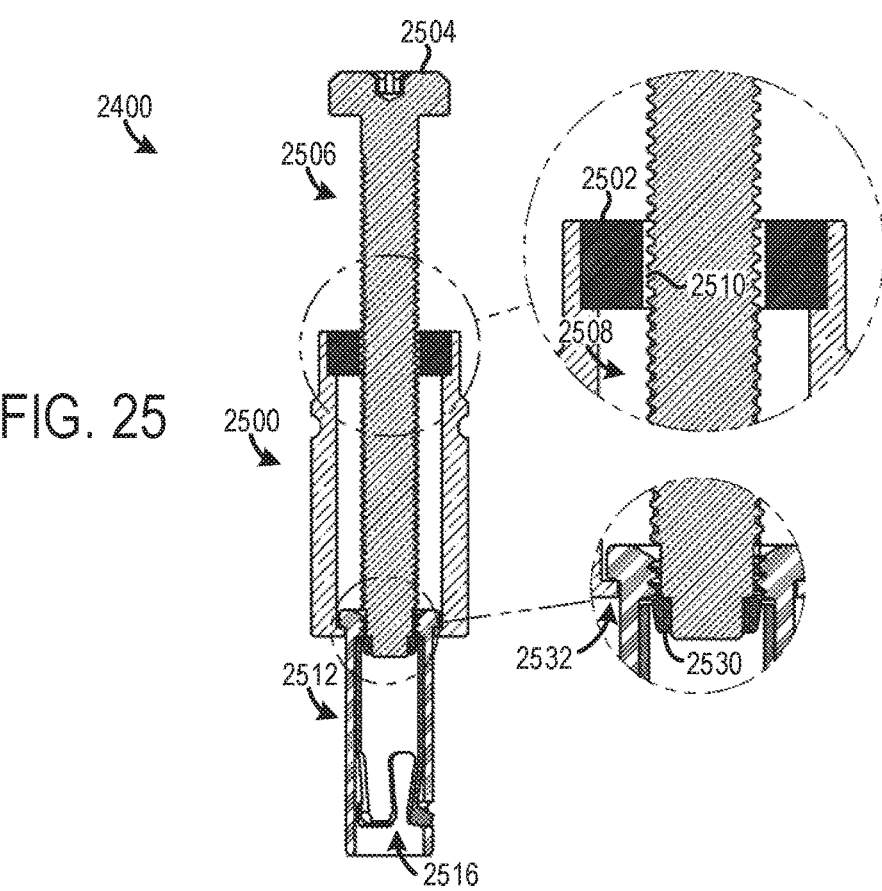

FIG. 26
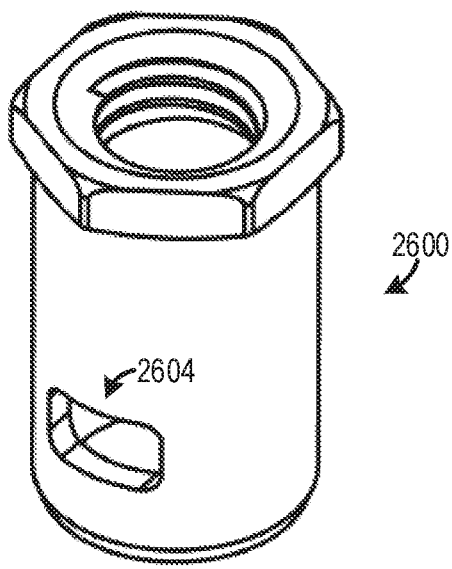
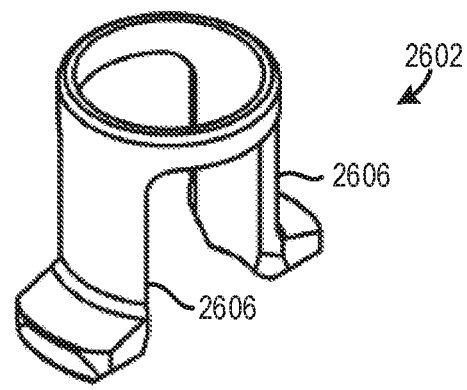

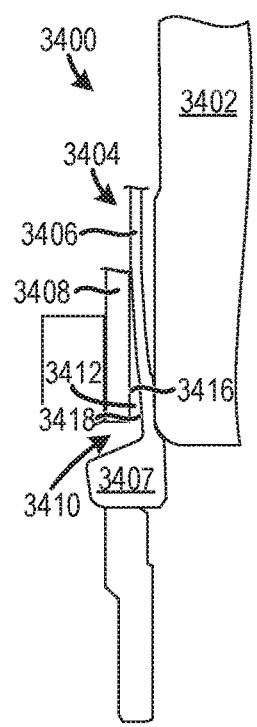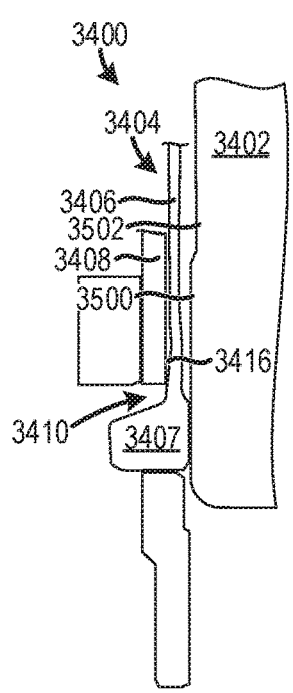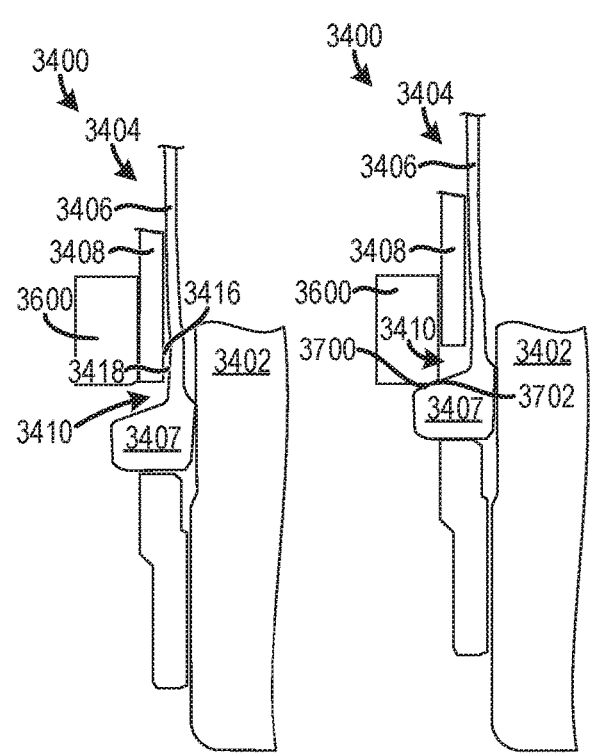

FIG. 39
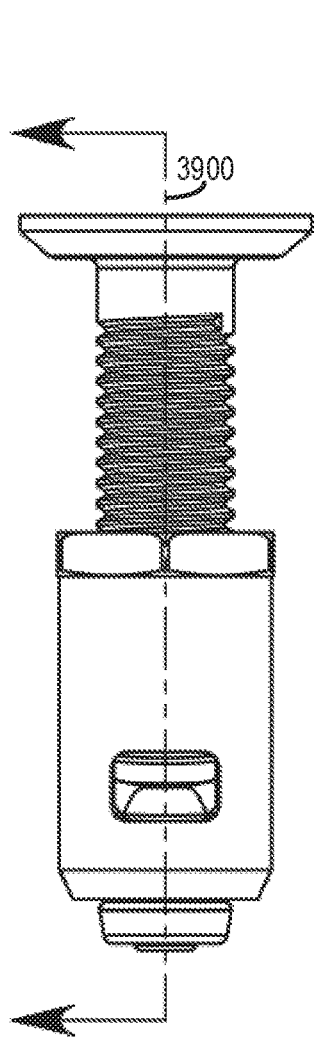
FIG. 40
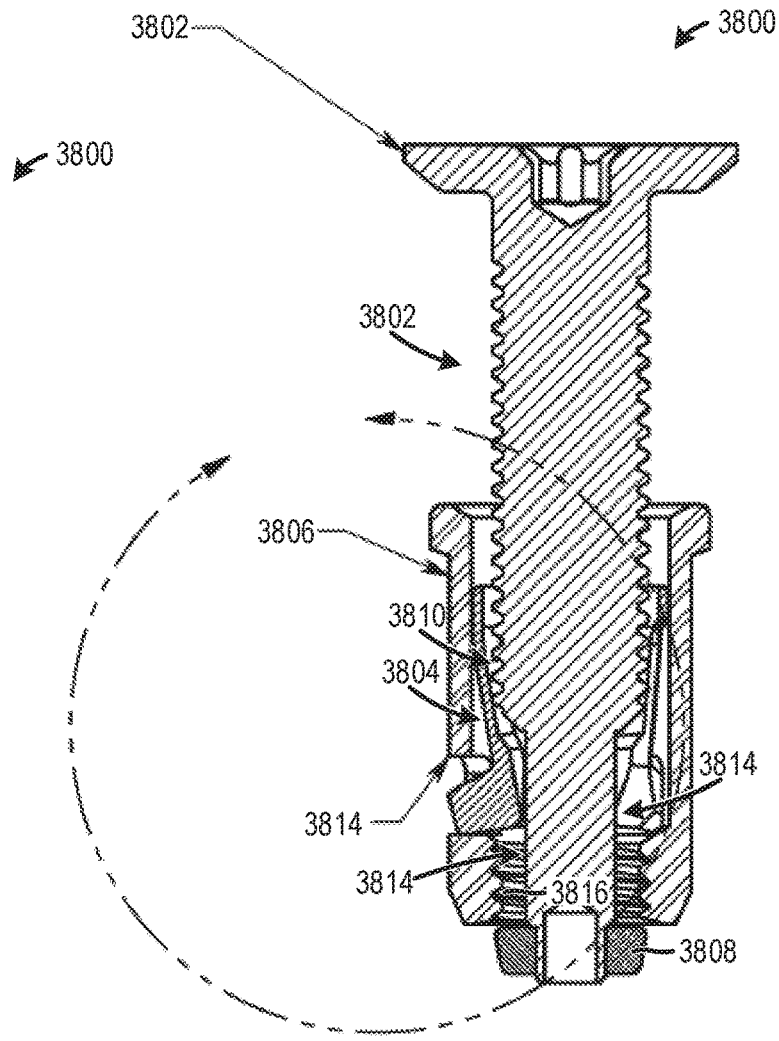
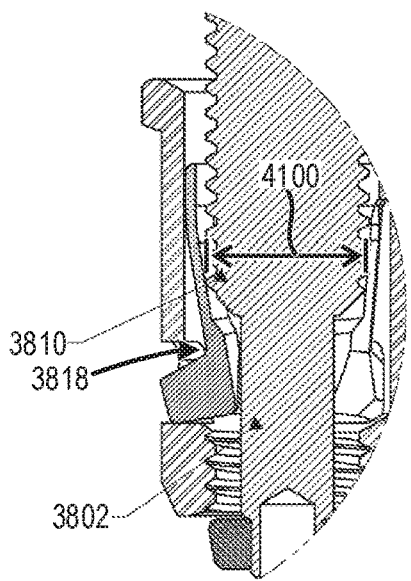
FIG. 41

FASTENER SYSTEM

CROSS REFERENCE TO RELATED APPLICATION

The present application claims priority to U.S. Provisional Application No. 62/558,762, entitled "Fastener System", and filed on Sep. 14, 2017. The entire contents of the above-listed application are hereby incorporated by reference for all purposes.

FIELD

The present description relates generally to a fastener system designed to clamp two structures.

BACKGROUND AND SUMMARY

Many manufacturing fields use fasteners, such as blind fasteners, for securing two objects to one another. Blind fasteners are particularly useful when only one side of a joint is accessible. One application of such fasteners is in the aerospace industry where removable collet fasteners are utilized to secure floor panels to underlying floor beams. Using removable fasteners to secure floor panels to the floor beams increases the modularity of the aircraft's cabin. Resultantly, the aircraft's interior may be altered at a late stage in manufacturing to increase the adaptability of aircraft manufacturing processes. Therefore, the manufacturer or in some cases the customer may alter the floor panel layout to reconfigure the airplane when desired. In other examples, the collet fasteners may be used to attach wing components, fuselage components, pylons, etc., providing the same benefits of increased manufacturing adaptability. Previous blind fasteners have included a stud threading into a collet body having fingers that radially expand when said threading occurs. When expanded the fingers slide under a lower structure to act as a lower clamping arm while a surface of the stud head acts as an upper clamping arm to retain an upper structure.

However, the inventors have recognized several drawbacks with previous blind fasteners. For instance, the collet body may be susceptible to shear stresses due to external structural loading and the external position of the collet body in the fastener. The collet body contains multiple flexible arms that, as a necessity of the prior fasteners, operate independently from one another. As such, they are disjointed and do not communally share shear strength with one another. When in shear, only the flexible arms directly in contact with the load path can resist the shearing force. In the previous fasteners, the flexible arms are tangentially positioned at a maximum distance from a line created by the intersection of the shear force vector acting through the center of the collet body. These flexible arms resist very little, if any, of the shearing force. As a result, individual flexible legs in prior fasteners can become substantially damaged and fail, or suffer other forms of damage (e.g., permanent deformation) that impede desired functions of the flexible legs. The stud may be difficult to remove and in some cases become stuck within the collet body when the fastener clamps two adjoining structures. Furthermore, the fingers in the collet body may be difficult to insert into a bore due to the exposed edges of the collet body fingers now deformed and protruding radially outward, due to damage sustained in resisting shear.

Facing the aforementioned challenges the inventors developed a fastener system. The fastener system includes a sleeve with a sleeve opening and a collet body at least partially enclosed within the sleeve, the collet body including a crown having a crown opening, and a cantilever leg extending from the crown and including a foot configured to mate with the sleeve opening when the fastener system is in an engaged configuration. The fastener system also includes a stud extending through the crown opening and includes a threaded section engaging with an interior threaded section in at least one of the collet body and/or the sleeve. In this way, the cantilever leg may be protected by the collet body and shear stresses on the cantilever leg may be decoupled from the collet body while the system exerts a clamping force on two structures. In particular, the sleeve protects the collet body from shear stresses across the flexing part of the cantilever leg created from sideways forces in the structures that are being fastened. Thus, the longevity of the fastener described herein, when compared to previous fasteners that suffer from shear stresses degrading the ability of the cantilever leg to flex or retain its memory shape, can be increased. Moreover, the fastener also allows the stud to be easily threaded and unthreaded without binding, enabling the system to be easily and efficiently installed as well as removed. Moreover, when the collet body is constructed out of a nonmetallic material, such as a polymer, the sleeve protects the collet body from abrasive wear during insertion and removal, decreasing the likelihood of fastener degradation.

In one example, advancing engagement between the threaded section of the stud and the interior threaded section decreases a distance between an upper clamping surface and a lower clamping surface, the lower clamping surface is included in the foot and the upper clamping surface is included in the stud. In this way, the clamping force generated by the fastener system can be varied to provide a desired amount of coupling between two components while the shear stresses are, to a large extent, uncoupled from the collet body.

In another example, the stud may include a reduced diameter section (e.g., unthreaded section) positioned near a bushing engagement zone. The reduced diameter section is configured to allow the stud to freely spin when the stud is unthreaded and disengaged from the interior threaded section. Allowing the free rotation of the stud in this manner prevents the stud from damaging the sleeve or collet body during disengagement.

In another example, the fastener system may include an auxiliary structure at least partially extending around the sleeve and including a lower surface acting as a lower clamping surface. The auxiliary structure enables quick and efficient removal of the system after it is unclamped and also may require less machining of the bores in the clamped structures. In this way, the fastener system may be utilized in a broader range of structures.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 24 and 25 show a fifth example fastener system including an auxiliary structure.

FIG. 26 shows another example of a sleeve and collet body included in a fastener system.

FIGS. 34-37 show a clamping sequence in an eighth example fastener system.

FIGS. 38-43 show a ninth example fastener system including sleeve with a threaded section.

FIGS. 1-47 are drawn approximately to scale, however other relative dimensions may be used in other embodiments.

DETAILED DESCRIPTION

The following description relates a fastener system designed to decouple shear stresses from a collet body and provide clamping engagement to targeted structures. Decoupling of the shear stresses from the collet body enables quick, efficient, and unobstructed engagement and disengagement of clamping arms in the system. In particular, the fastener system is designed to decouple shear forces from a weaker section (i.e., cantilever legs) and place the same shear forces onto a much stronger section (i.e., a sleeve). As a result, the fastener system has excess capacity, enabling the system to carry additional shear forces. The fastener system includes a collet body that fits within a sleeve. The collet body is provided with feet on the end of cantilever legs extending downward from a crown. When the fastener system is in an engaged configuration and a stud is threaded into the collet body and sleeve, the feet protrude through openings in the sleeve. The sleeve protects the collet body and prevents shearing forces from acting on the collet body while allowing the feet to function as lower clamping arms. An underside of the head of the stud or an auxiliary structure surrounding the sleeve may act as an upper clamping arm. As the stud is further threaded into the collet body and sleeve, a distance between the feet and a head of the stud decreases. In this way, the clamping force generated by the fastener system can be varied to provide a desired amount of engagement between two structures. The stud may also include an unthreaded section at one end. The unthreaded section is designed to enable free rotation of the stud with regard to the sleeve and collet body when the stud is disengaged (e.g., fully backed out) from an interior threaded section in the sleeve or collet body. Consequently, the stud may be prevented from damaging the sleeve or collet body during disengagement (e.g., maximum disengagement).

Figure 5:
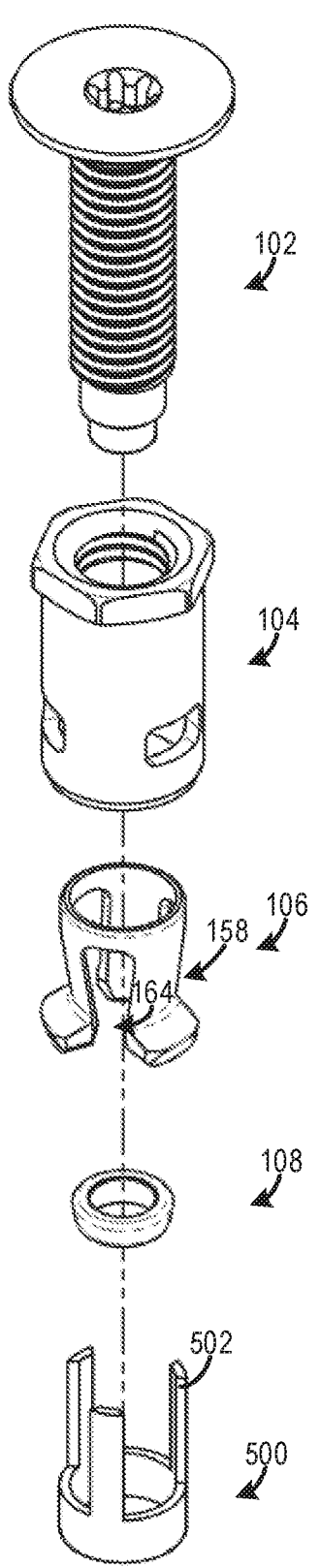
FIG. 5 shows an exploded view of the first example fastener system, illustrated in FIG. 1, with a retainer.
Figure 6:
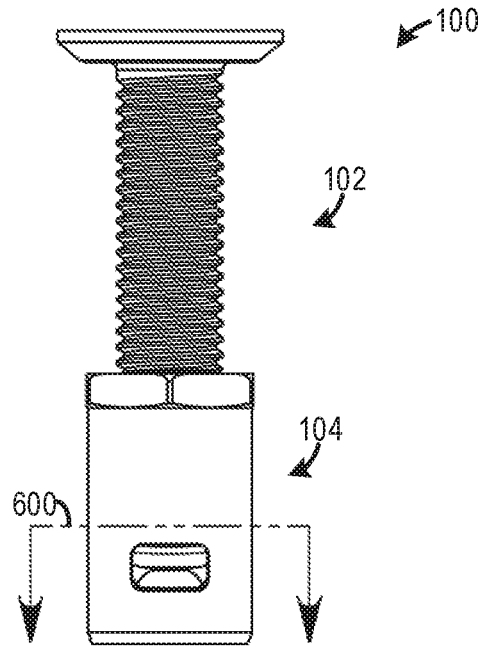
FIG. 6 shows the fastener system, illustrated in FIG. 5, in an assembled state.
Figure 7:
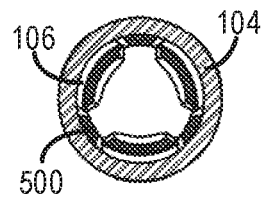
FIG. 7 shows a cross-sectional view of the fastener system, depicted in FIG. 6.
Figure 15:
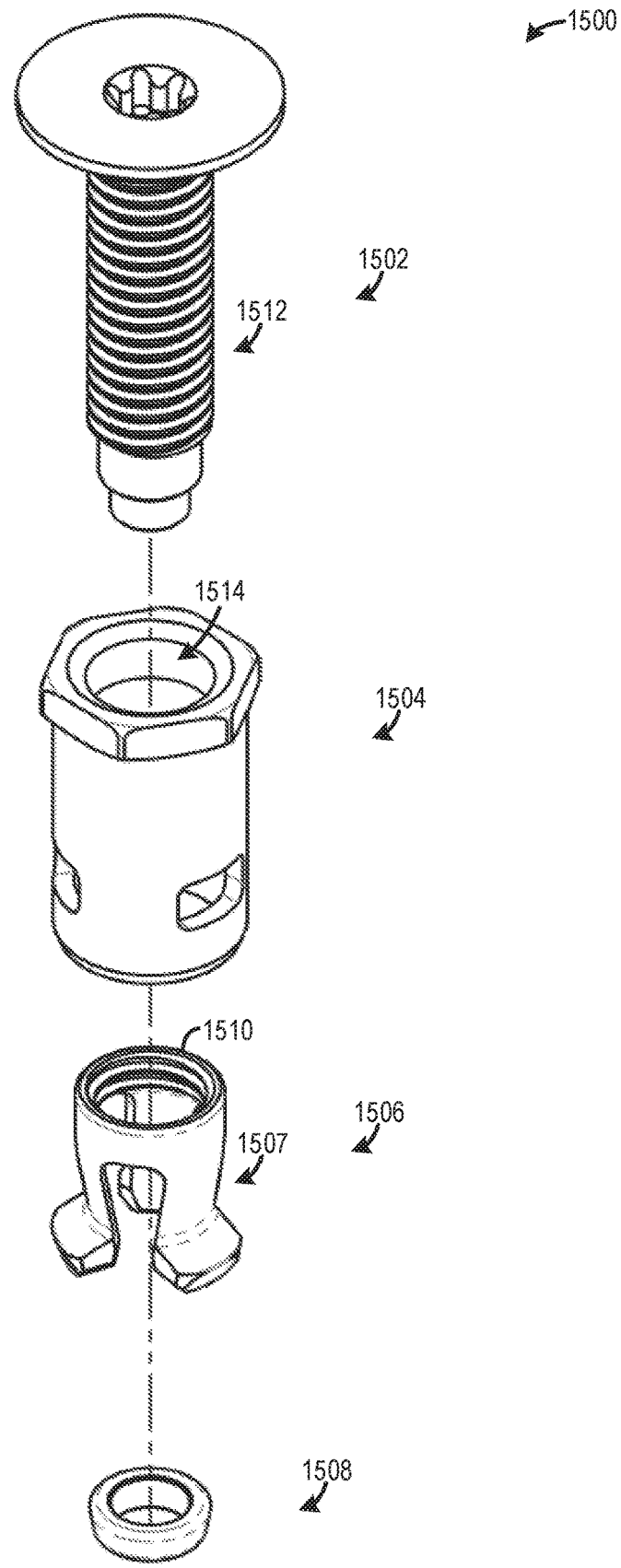
FIG. 15 shows an exploded view of a second example fastener system.
Figure 16:
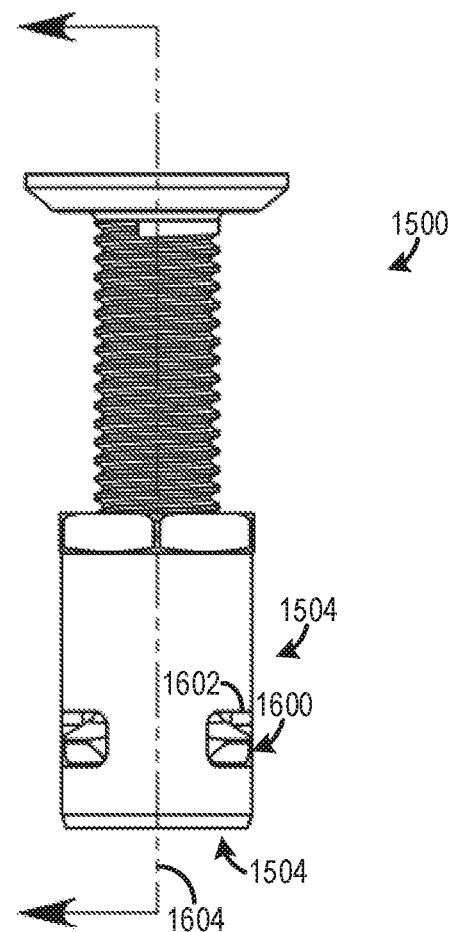
FIG. 16 shows the second example fastener system, depicted in FIG. 15, in an assembled state.
Figure 17:
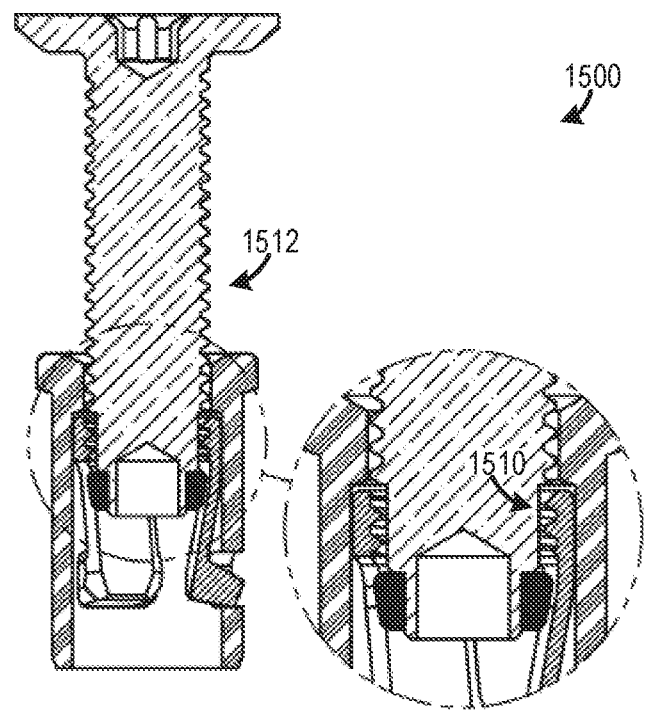
FIG. 17 shows a cross-sectional view of the second example fastener system, depicted in FIG. 16.
Figure 22:
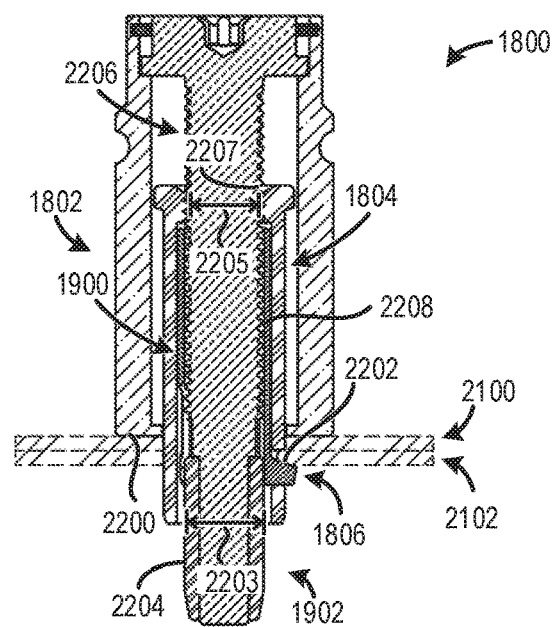
Figure 23:
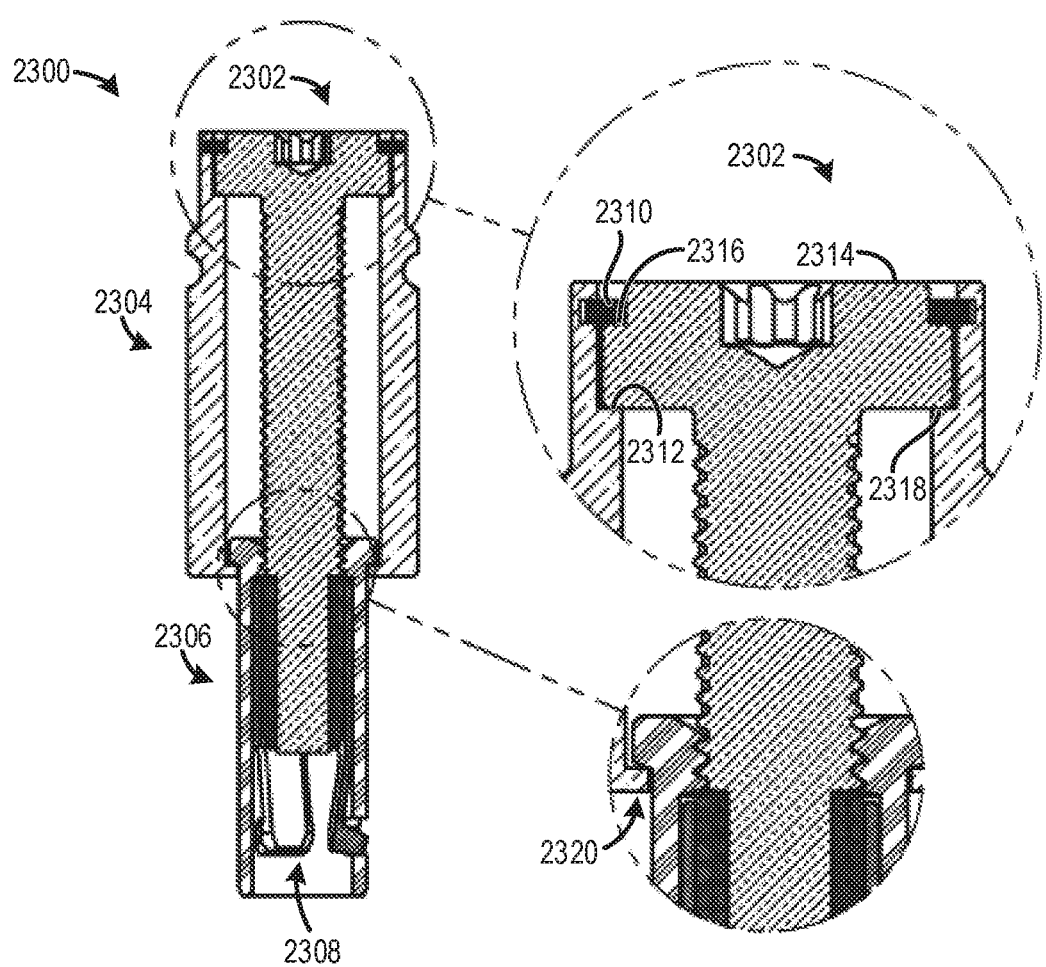
FIG. 23 shows a fourth example fastener system.
Figure 27:
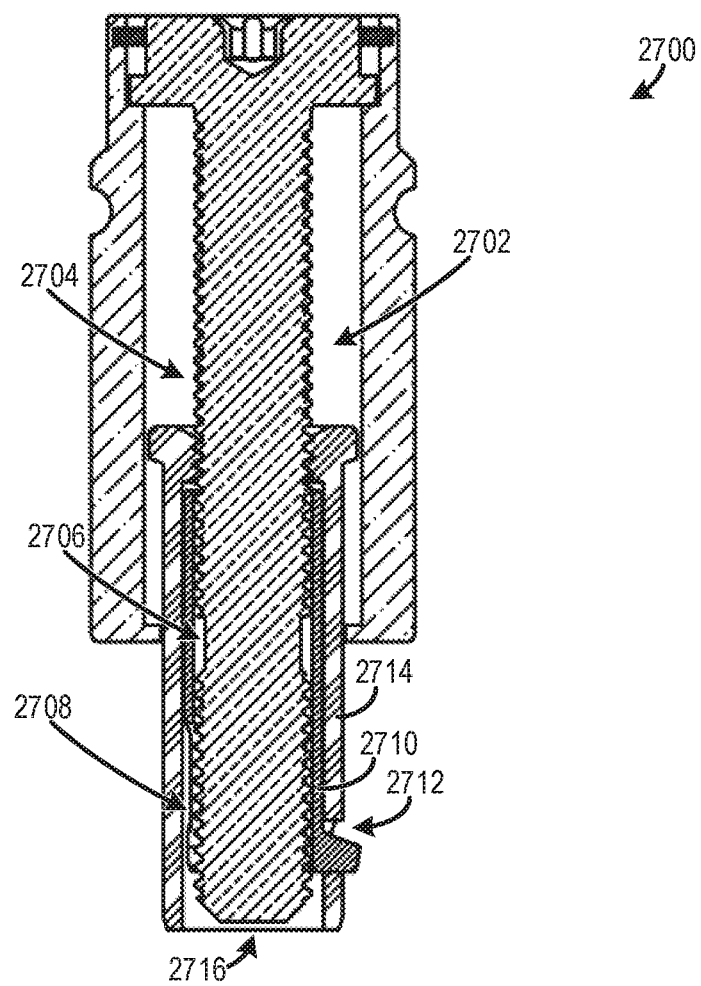
FIG. 27 shows a sixth example fastener system including a stud with an upper and lower threaded section.

FIGS. 1-4 show a first example of a fastener system. FIGS. 5-7 show the first example of the fastener system with a retainer functioning to securely retain a collet body in a sleeve. FIGS. 8-14 show an engagement sequence where the fastener system engages with structures. FIGS. 15-17 show a second example of a fastener system where the collet body includes a threaded section designed to engage with threads in the stud. FIGS. 18-22 show a third example of the fastener system including an auxiliary structure. FIG. 23 shows a fourth example of the fastener system again including an auxiliary structure. FIGS. 24-25 show a fifth example of the fastener system where the auxiliary structure includes an upper threaded section. FIG. 26 shows a sixth example of the fastener system including a collet body with a pair of cantilever legs designed to mate with a pair of openings in a sleeve. FIG. 27 shows a seventh example of the fastener system including a stud with a free-spin zone and an auxiliary structure. FIGS. 28-33 show an eighth example of the fastener system including a retaining ring and a stud including an increased diameter threaded portion. FIGS. 34-37 show an engagement sequence in a fastener system. FIGS. 38-43 show a ninth example of a fastener system. FIGS. 44-47 show a tenth example of the fastener system including a split collet body. FIG. 48 shows a method for operation of a fastener system to assemble the fastener and then clamp and unclamp the fastener from structures.

Figure 1:
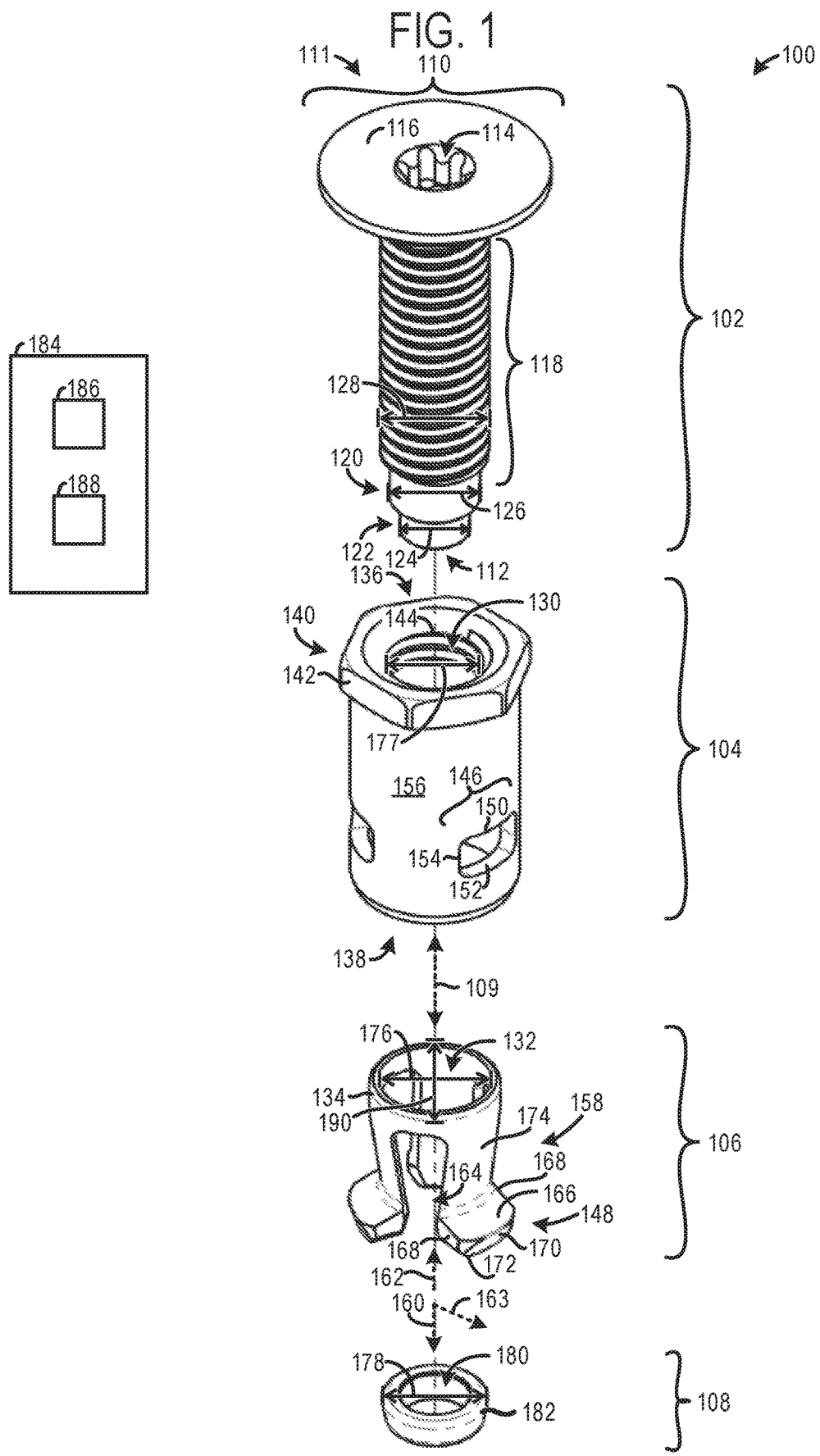
FIG. 1 shows an exploded view of a first example fastener system.

Turning to FIG. 1, an exploded view of a fastener system 100 is illustrated. The fastener system 100 includes a stud 102, a sleeve 104, a collet body 106, and a bushing 108. Each of the components in the fastener system 100 share a common central axis 109.

The stud 102 includes a first end 111 and a second end 112. A head 110 is included in the first end 111. The head includes a tool interface 114. In the illustrated example, the tool interface 114 is a splined recess. However, other suitable types of interfaces have been contemplated such as hexagonal recesses, slotted recesses (e.g., a Phillips type recess), a square recesses, external spine or hex for use with conventional sockets, etc. The tool interface 114 is designed to receive a driver (e.g., splined driver, hexagonal driver, etc.,) inducing rotation (e.g., clockwise or counterclockwise rotation) of the stud 102 about the central axis 109.

The head includes an upper surface 116. In the illustrated example, the upper surface 116 is planar. However, other contours of the upper surface of the head have been contemplated. The stud 102 further includes a threaded section 118, a first reduced diameter section 120, and a second reduced diameter section 122 (e.g., bushing engagement zone). In the depicted example, the first reduced diameter section is unthreaded. However, in other examples, at least a portion of the first reduced diameter portion may be threaded.

The second reduced diameter section 122 is configured to mate with the bushing 108 at the second end 112 of the stud 102. As illustrated, the second reduced diameter section 122 has a cylindrical shape with an outer diameter 124 that is less than an outer diameter 126 of the first reduced diameter section 120. However, other contours of the second reduced diameter section 122 have been contemplated. Additionally, an outer diameter 128 of the threaded section 118 is greater than the outer diameter 126 of the first reduced diameter section 120, in the illustrated example. In this way, the second end 112 of the stud 102 may travel through a central aperture 130 in the sleeve 104 and a crown opening 132 in a crown 134 of the collet body 106.

The sleeve 104 includes a first end 136 and a second end 138. The first end 136 includes a facetted collar 140. The facetted collar 140 includes planar surfaces 142. In the depicted example, the planar surfaces 142 form a hexagonal shape. However, numerous shapes have been contemplated. Such as square shapes, pentagonal shapes, octagonal shapes, etc. Furthermore, the collar may include lobes or other protrusions that are not planar, in other examples. The surfaces on the collar, being planar or non-planar, are configured to limit (e.g., substantially inhibit) rotation of the sleeve 104 while allowing axial translation during installation and removal of the fastener system. The facetted collar 140 may be mated with a bore in a structure, having a corresponding geometry (e.g., hexagonal shape) to limit (e.g., substantially inhibit) rotational movement about axis 109 of the sleeve 104 and therefore collet body 106 while the stud 102 is rotated or vice-versa and correspondingly facilitates axial translation of the sleeve. However, in other examples, the facetted collar 140 may be gripped by a tool, held by a tool body, or held by an auxiliary structure to inhibit movement of the sleeve 104 while the stud 102 is rotated while allowing axial translation of the sleeve.

The sleeve 104 further includes an interior threaded section 144. The interior threaded section 144 in the sleeve 104 is designed to engage with the threaded section 118 in the stud 102 when the stud is inserted into the central aperture 130 and rotated to initiate engagement.

The sleeve 104 also includes opening 146 (e.g., sleeve openings) configured to mate with feet 148 in the collet body 106, discussed in greater detail herein. Additionally, the openings 146 include an upper side 150, lower side 152, and lateral sides 154. The sides of the openings limit (e.g., substantially inhibit) rotational movement about axis 109 of the feet 148, when the collet body 106 is mated with the sleeve 104. Furthermore, the openings 146 radially extend outward through a housing 156 of the sleeve 104. Additionally, the openings 146 are equally spaced around the housing 156, in the illustrated example. However, unequal spacing of the openings has been contemplated. Additionally, the fastener system 100 includes a corresponding number of openings 146 in the sleeve 104 and feet 148 in the collet body 106. However, the fastener system 100 may include a mismatched number of feet and openings, in other examples. Furthermore, the fastener system 100 includes three openings and three feet, in the illustrated embodiment. However, alternate numbers of feet and/or openings have been envisioned.

The collet body 106 includes cantilever legs 158 extending in an axially downward direction 160 from the crown 134. As referred to herein an axially downward direction is an axial direction extending toward the bushing 108 or other lower end system components while an axially upward direction 162 is an axial direction extending toward the head 110 of the stud 102 or other upper end system components. An exemplary radial axis 163 is also provided for reference. It will be appreciated that the central axis 109 may be parallel to a gravitational axis, in some examples. However, in other examples, alternative orientations of the central axis have been contemplated. The cantilever legs 158 are configured to act as springs and generate return forces in response to radial bending in both inward and outward directions. However, in FIG. 1, the cantilever legs 158 are in a neutral position. In one example, the cantilever legs 158 may be pre-bent and/or heat-treated to enable the legs to achieve the neutral position, shown in FIG. 1. The heat-treating may also increase the spring action in the legs. It will also be appreciated that the cantilever legs 158 will return to their neutral states after being deformed (e.g., bent inward and outward). In other examples, the cantilever legs 158 may be in a neutral state when the fastener system is in the engaged configuration, such as when the fastener system is constructed out of a polymer.

As depicted, the cantilever legs 158 are spaced away from each other such that gaps 164 are formed there between. The cantilever legs 158 include feet 148 protruding radially outward from lower end and outer sections of the cantilever legs 158. The feet 148 are contoured to mate with the openings 146 in the sleeve 104. Specifically, the feet 148 each include an upper surface 166, side surfaces 168, a peripheral surface 170, and a lower surface 172, in the illustrated example.

The cantilever legs 158 additionally include a hinge zone 174. The hinge zone 174 may be formed naturally or enhanced adjacent to where the cantilever legs 158 join to crown 134 of collet body 106. This hinge zone 174 enables the cantilever legs to flexibly swing in an arc during radial loading and unloading. In one example, the hinge zone 174 may include a tapered section (e.g., radially tapered section) that facilitates leg flexion.

The collet body crown 134 includes the crown opening 132 having an inner diameter 176 that is greater than an outer diameter 128 of the threaded section 118 of the stud 102. In this way, the crown opening 132 is sized to receive the stud 102. Additionally, the crown has an annular shape, in the illustrated example. However, alternative crown contours have been contemplated. Furthermore, the crown opening is sized to receive the bushing 108, in the depicted example. That is to say, that an outer diameter 178 of the bushing 108 is smaller than the inner diameter of the crown opening 132. However in other instances, the crown 134 may be sized to retain the bushing 108 such that the inner diameter 176 of the crown opening 132 is less than the outer diameter 178 of the bushing 108. As such, the crown may be configured to limit axial movement of the stud 102. Additionally, the central aperture 130 in the sleeve 104 has a smaller diameter 177 than the outer diameter 178 of the bushing 108. In this way, the axial movement of the bushing upwards through the collar of the sleeve may be inhibited.

The bushing 108 has an annular shape and includes an opening 180 sized to mate with the second reduced diameter section 122 of the stud 102, as previously discussed. More specifically, the bushing 108 may be press fit, braised, pinned, bonded, threaded, and/or welded to the stud 102. Thus, the bushing 108 may be permanently or removably attached to the stud 102. The bushing acts to lock the components of the system together to form a cohesive unit, especially while the system is in a disengaged configuration. The bushing 108 may also include a peripheral surface 182 that is contoured to interact with the cantilever legs 158 and push them in an outward direction when slid through the collet body. In one example, the peripheral surface 182 may be tapered in a downward direction. In other examples, the bushing 108 may not interact with the cantilever legs 158 during engagement.

Additionally, the components of the fastener system may be constructed out of a similar material such as metal (e.g., steel, aluminum, etc.,), a polymer, etc., in one example. However, in other examples, the stud 102, sleeve 104, collet body 106, and/or bushing 108 may be constructed out of different materials. For instance, the sleeve may be constructed out of aluminum while the collet body 106 may be constructed out of a more spring-biased material, such as steel. Moreover, the materials used to construct the different components in the fastener system may be chosen based on end use requirements. It will be appreciated that for structural applications (e.g., large load bearing structures) the fastener system may be constructed out of steel. On the other hand, when designed for commercial applications the fastener system may employ plastics. Further, in other examples, the fastener system may have a hybrid material construction where both plastic and metal are utilized. Furthermore, when plastic collet bodies, a possibility in the commercial sector, the legs may be in an open position in an engaged and disengaged configuration and flex closed when the collet body is inserted into the sleeve, or when the system is inserted/removed from a bore. In this instance, the plastic may be designed to be easily flexed (e.g., pushed or pulled) by a person to cause the cantilever legs to flex inward and thus allow easy egress of the fastener through the bore.

FIG. 1 also shows an automated tooling apparatus 184 that may be used to manipulate the fastener system and carry out the methods described herein. The tooling apparatus 184 may include a processor 186 and memory 188 (e.g., non-transitory memory) storing instructions executable by the processor. It will be appreciated that the automated tooling apparatus 184 may further include tooling attachments, arms, carriages, etc., for manipulating the fastener system.

Figure 2:
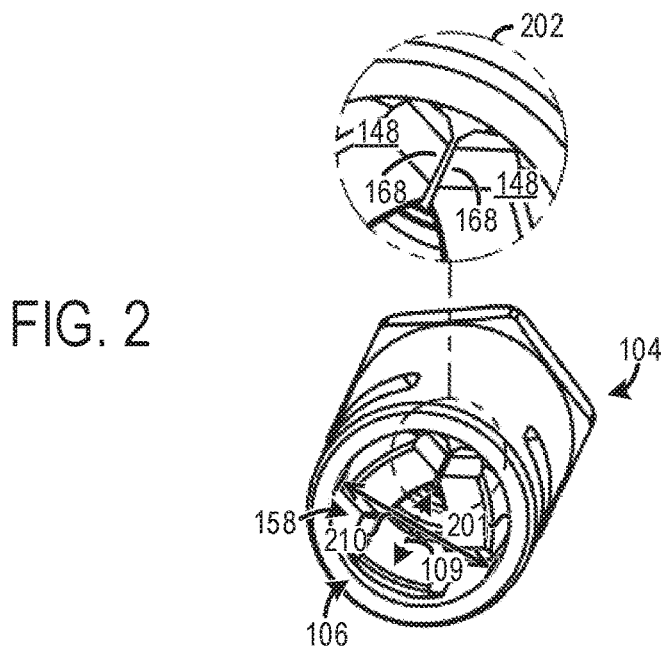
FIG. 2 shows a view of a collet body assembled with a sleeve included in the fastener system, depicted in FIG. 1.

FIG. 2 shows a view of the collet body 106 partially mated with the sleeve 104. The partial mating of the collet body 106 with the sleeve 104 is induced by bending the cantilever legs 158 inwardly toward the central axis 109 and sliding the collet body 106 into the sleeve in an upward direction. In the illustrated example, the feet 148 are bent inwardly toward the central axis 109 such that side surfaces 168 of successive extensions are adjacent to one another but still maintain a slight gap there between. However, in other examples, the cantilever legs 158 may be bent such that the side surfaces 168 may be in contact or near contact during the mating procedure. Additionally, peripheral surfaces 170 of the cantilever legs 158 are in contact with an inner surface 201 of the sleeve 104. Furthermore, the inner surface 201 of the sleeve 104 may have a greater diameter than the interior threaded section 144 of the sleeve 104, shown in FIG. 1. Moreover, the inner surface 201 of the sleeve 104 may also have a diameter 210 that is larger than the outer diameter 190 of the crown 134 of collet body 106, shown in FIG. 1. FIG. 2 shows an expanded view 202 of a portion of the sleeve 104 and the collet body 106 to assist in viewing of specific features of the system. In some of the figures described below additional expanded views are show to achieve the same purpose. Redundant descriptions of these views are omitted.

Figure 3:
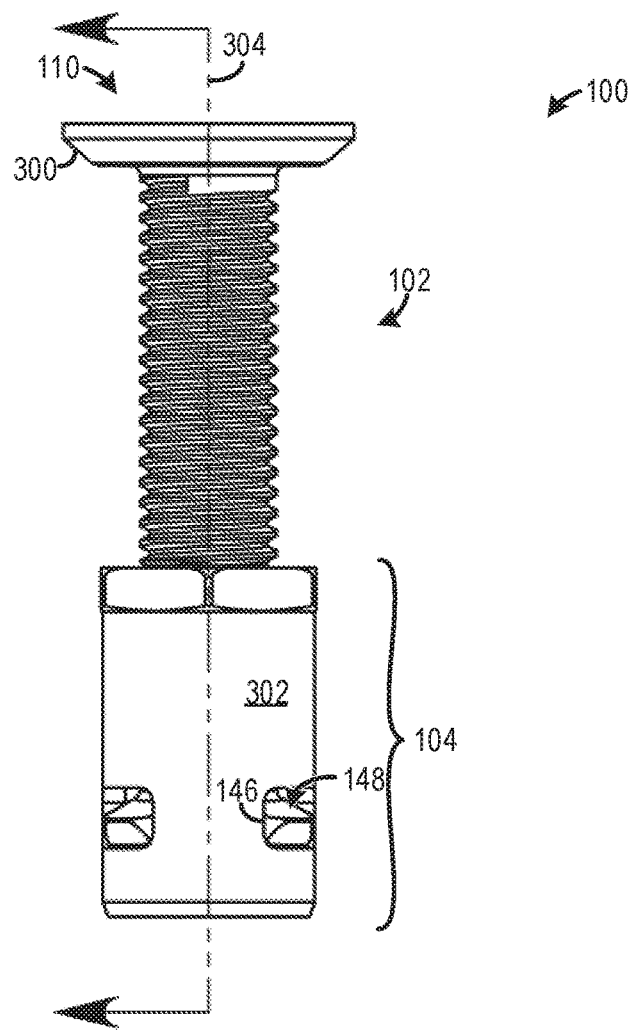
FIG. 3 shows the first example fastener system, depicted in FIG. 1, in an assembled state.

FIG. 3 shows the fastener system 100 of FIG. 1 assembled in a disengaged configuration. In the disengaged configuration the feet 148 only partially extend through the openings 146 of the sleeve 104. FIG. 3 also shows the stud 102 partially threaded into the sleeve 104.

FIG. 3 shows the head 110 of the stud 102 having a lower surface 300. It will be appreciated that the lower surface 300 may act as a clamping surface in the fastener system 100. The lower surface 300 includes a portion that tapers in a downward direction and a portion that extends inwardly. However, other lower surface contours have been contemplated, such as a flat surface.

Aside from the openings 146, the sleeve 104 includes a continuous external surface 302 that circumferentially surrounds the portions of the collet body besides the feet 148. Using a sleeve 104 contoured in this manner enables the collet body to be protected from external forces, such as shear forces. As such, the sleeve 104 acts to decouple the cantilever legs of the collet body from shear stresses when used for clamping two structures. In particular, the shear forces are for the most part decoupled from a weaker section (e.g., cantilever legs) and placed onto a stronger section (e.g., the sleeve). As a result, the fastener system has excess capacity, enabling the system to carry additional shear forces. As described herein sheer stress is the component of stress coplanar with a material cross-section. Consequently, the stud 102 may be more easily unthreaded from the sleeve 104. However, in other examples the sleeve 104 may include additional voids that may reduce the weight of the sleeve. FIG. 3 also shows the viewing plane 304 indicating the cross-sectional view illustrated in FIG. 4.

Figure 4:
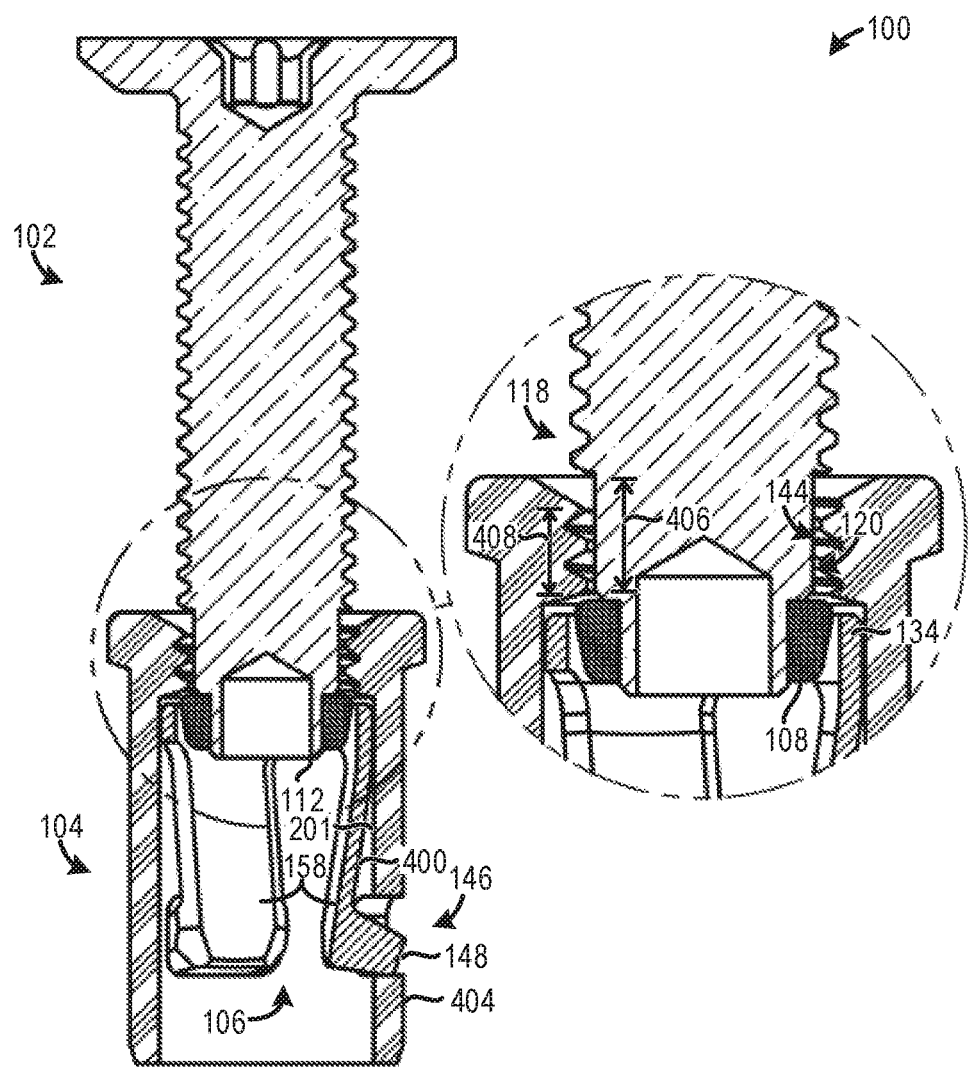
FIG. 4 shows a cross-sectional view of the fastener system, illustrated in FIG. 3.

FIG. 4 shows a cross-sectional view of the fastener system 100, shown in FIG. 3. The threaded section 118 of the stud 102 is shown engaged with the interior threaded section 144 of the sleeve 104. The second end 112 of the stud 102 having the bushing 108 attached thereto, is also shown positioned within the crown 134 of the collet body 106.

Additionally, FIG. 4 illustrates the fastener system 100 in the disengaged configuration where the cantilever legs 158 are not radially loaded by the stud 102. In the disengaged configuration outer surfaces 400 of the cantilever legs 158 are at least partially spaced away from an inner surface 201 of the sleeve 104. Furthermore, in the disengaged configuration the feet 148 only partially extend through the openings 146 such that they do not radially extend beyond an outer surface 404 of the sleeve 104. In this way, the fastener system 100 may be easily inserted through bores in structures slated for clamping by the system. However, in other examples, in the disengaged configuration the feet 148 may slightly protrude from the openings such that movement of the system through bores would urge the feet back into the openings.

Furthermore, when the feet 148 partially extend through the openings 146, the openings function to limit the movement of feet 148 and therefore collet body 106. Thus, the relative positions of the sleeve 104 and the collet body 106 can be essentially fixed to one another when the feet 148 are partially mated as well as fully mated with the openings 146.

The first reduced diameter section 120 (e.g., unthreaded section) of the stud 102 is also designed to allow the stud to freely rotate. This may be particularly useful when unthreading the stud during removal when people or automated tooling machines fail to vary the applied torque while backing out the stud 102. As such, the free spin feature prevents the tool from over torqueing the stud during removal and damaging the system. To enable the free rotation of an axial length 406 of the first reduced diameter section 120 on the stud is equal to or greater than an axial length 408 of the interior threaded section 144 of the sleeve 104. The free spin feature may be included in any of the examples or combinations of the examples of the fastener system, described herein. However, in other instances, as described in greater detail herein, the fastener system may be designed with a hard stop feature that does not allow the free rotation of the stud.

FIGS. 5-7 show an example of the fastener system 100 with a retainer 500. Specifically, FIG. 5 shows an exploded view of the fastener system 100, FIG. 6 shows an assembled view of the fastener system depicted in FIG. 5, and FIG. 7 shows a cross-sectional view of the fastener system, illustrated in FIG. 6. Viewing plane 600 shown in FIG. 6 indicates the cross-section of FIG. 7. The fastener system 100 is again shown to include the stud 102, sleeve 104, collet body 106, and bushing 108. The retainer 500 includes prongs 502 configured to extend through gaps 164 between the cantilever legs 158 in the collet body 106. Consequently, the collet body 106 may be even more securely retained within the sleeve 104.

Figure 8:
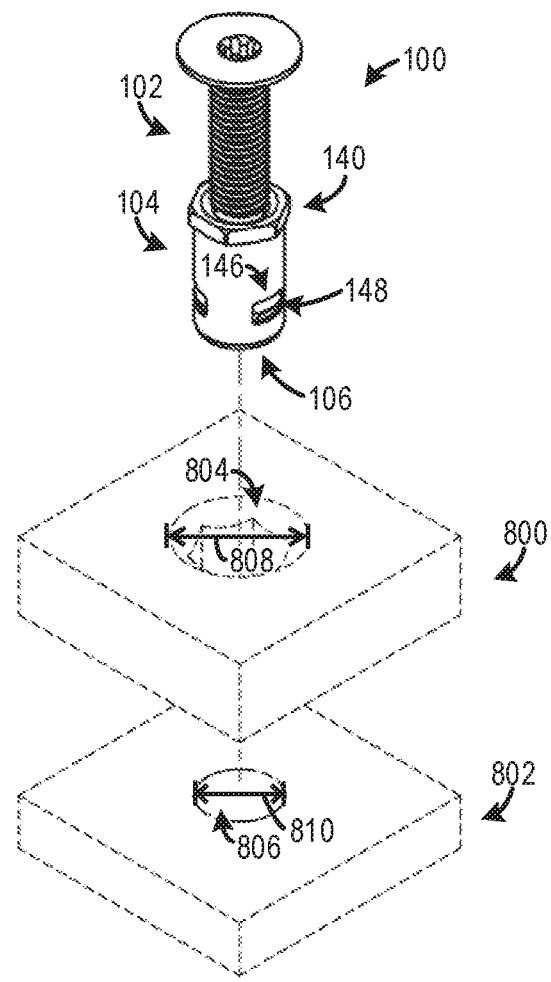
FIGS. 8-14 show a sequence of tooling steps where the third fastener system is used to clamp two structures together.

FIGS. 8-14 show a sequence for clamping an upper and lower structure, 800 and 802, using the fastener system 100. In particular, FIG. 8 shows the fastener system 100 prior to insertion through bores, 804 and 806, in the upper structure 800 and the lower structure 802, respectively, slated for clamping by the system. In one example, the upper structure 800 may be a floor panel in an aircraft and the lower structure 802 may be a floor beam. However, the fastener system 100 may be used to clamp numerous structures in other aerospace components as well as structures in other fields such as construction, the maritime industry, the automotive industry, etc.

In FIG. 8 the fastener system 100 is in the disengaged configuration to enable easy insertion through the bores 804 and 806. When the fastener system 100 is in the disengaged configuration the feet 148 are partially mated with the openings 146. In such a configuration, the openings 146 substantially inhibit movement of the collet body 106 with regard to the sleeve 104. As shown, the upper bore 804 has a greater diameter 808 than a diameter 810 of the lower bore 806. Moreover, the upper bore 804 may be sized to mate with the facetted collar 140 in the sleeve 104. For instance, the upper bore and facetted collar may have a corresponding female and male hexagonal shape. In this way, the upper bore 804 allows axial movement of the sleeve through the bore and restricts (e.g., substantially inhibits) rotation of the sleeve 104 with regard to the bore. However, in other examples, a portion of the sleeve may be positioned external to the bore 804 and a tool may be used to restrict rotational movement of the sleeve.

Figure 9:
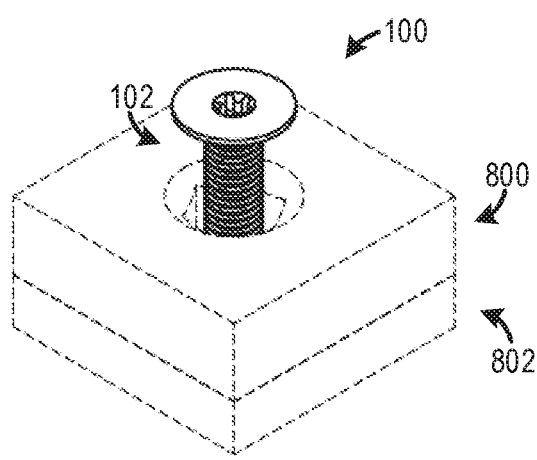

FIG. 9 shows the upper structure 800 and the lower structure 802 brought into contact with one another and the fastener system 100 inserted through the bores, 804 and 806, in the upper and lower structures, 800 and 802, shown in FIG. 8. FIG. 9 also shows a portion of the stud 102 positioned above the upper structure 800.

Figure 10:
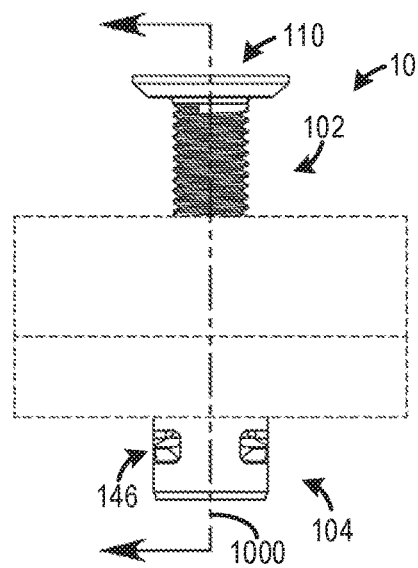

FIG. 10 illustrated a side view of the fastener system 100 and the upper and lower structures, 800 and 802, shown in FIG. 9. As illustrated, a portion of the sleeve 104 including the openings 146 extends below the lower structure 802. Conversely, the head 110 of the stud 102 extends above the upper structure 800. FIG. 10 also shows a viewing plane 1000 indicating the cross-sectional view illustrated in FIG. 11.

Figure 11:
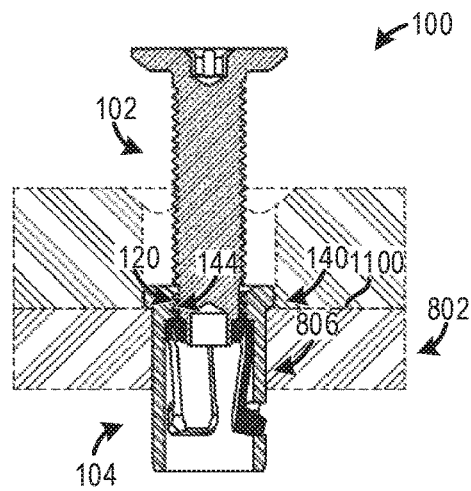

FIG. 11 shows the fastener system 100 in the disengaged configuration. FIG. 11 also shows the facetted collar 140 in the sleeve 104 in contact with an upper surface 1100 of the lower structure 802. In this way, the sleeve 104 can be inhibited from sliding through the bore 806 in the lower structure 802. Additionally, in the disengaged configuration, shown in FIG. 11, the stud 102 is allowed to spin freely due to the first reduced diameter section 120 of the stud 102 being aligned with the interior threaded section 144 of the sleeve 104.

Figure 12:
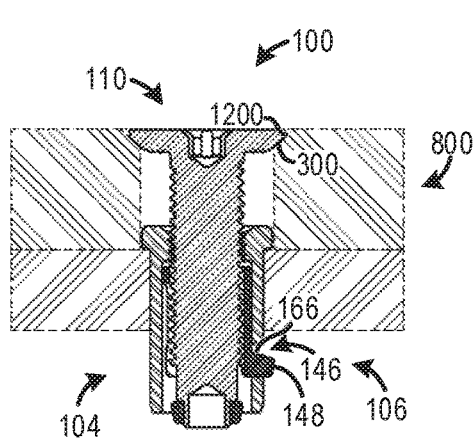
Figure 13:
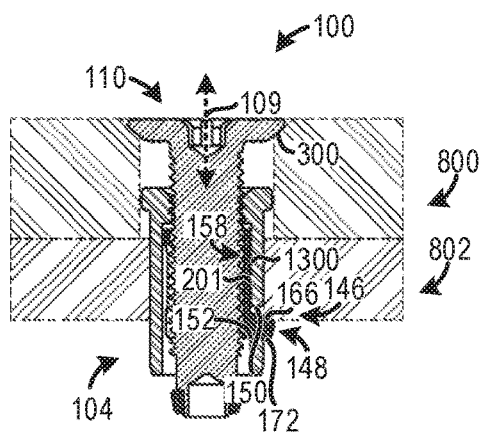

FIG. 12 depicts the fastener system 100 in an engaged configuration where the stud 102 is advanced into the sleeve 104 via rotation of the stud 102. Advancing the stud 102 into the sleeve 104 and collet body 106 pushes the feet 148 outwardly in radial directions such that they protrude out of the openings 146. As such, the upper surfaces 166 of the feet 148 may act as a lower clamping surface. FIG. 12 also shows the lower surface 300 of the head 110 of the stud 102 in contact or near contact with an upper surface 1200 of the upper structure 800. Thus, the lower surface 300 of the head 110 may therefore act as an upper clamping surface. Furthermore, when the fastener system 100 is in the engaged configuration the lower sides 152 of the openings 146 are in contact or near contact with the lower surfaces 172 of the feet 148. When such contact occurs forces are transferred from the sleeve to the feet FIG. 13 shows the fastener system 100 in the engaged configuration where the stud 102 is further advanced into the sleeve 104. Advancing the stud 102 into the sleeve 104 further decreases the distance between the feet 148 and the head 110 of the stud 102 to generate a clamping force to hold the upper structure 800 to the lower structure 802. In particular, the upper surfaces 166 of the feet 148 are in contact with the lower structure 802 and the lower surface 300 of the head 110 of the stud 102 is in contact with the upper structure 800 to provide engagement between the structures. It will be appreciated that the directions of the clamping forces may in some cases be parallel to the central axis of the fastener system. Furthermore, when fastener system is engaged (e.g., fully engaged) the feet 148 of the cantilever legs 158 see shear stress created by the tension in the fastening system (i.e., upward force of the sleeve and the downward reaction or static reaction generated by the structure being fastened). Specifically, the axial load in the fastener system is transferred from the sleeve 104 to the feet 148 of the collet body 106 and then to the lower structure 802. To enable the force transfer between the feet 148 and the sleeve 104, lower surfaces 172 of the feet are in contact with lower sides 152 of the openings 146. Additionally, it will be appreciated that in the engaged configuration the upper surfaces 166 of the feet 148 may be spaced away from the upper sides 150 of the openings 146. Furthermore, in the engaged configuration the cantilever legs 158 and feet 148 of the collet body may be prohibited or blocked from moving toward the central axis 109, in one example, due to the position of the stud 102. In particular, in the engaged configuration the stud 102 that has opened the legs may be positioned and contoured to prevent the cantilever legs 158 from retracting into the openings 146. Furthermore, the lower surfaces 172 of the feet 148 may be correspondingly contoured with the lower sides 152 of the openings 146. For instance, the lower surfaces 172 of the feet 148 and the lower sides 152 of the openings 146 may be planar. In such an example, the contact forces will hold these two flat surfaces together (in contact) and prevent rotation towards the central axis 109. However, in other examples, the stud 102 may be configured to block the cantilever legs 158 from closing and the feet 148 may not be in direct contact with the lower surfaces 172 of the openings 146.

Additionally, outer surfaces 1300 of the cantilever legs 158 may be adjacent to (e.g., near contact or direct contact) an inner surface 201 of the sleeve 104 when the fastener system 100 is in the engaged configuration, in one example. It will be appreciated that the outer surfaces 1300 of the cantilever legs 158 and the inner surface 201 of the sleeve 104 may have a small amount of clearance there between, due to design choice and/or manufacturing tolerances.

Figure 14:
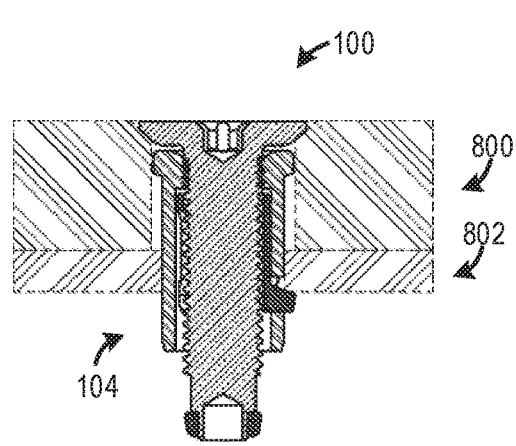

FIG. 14 depicts the fastener system 100 with the stud 102 even further advanced into the sleeve. Advancing the stud into the sleeve 104 allows an additional clamping force to be exerted on the upper structure 800 and the lower structure 802 such that the lower structure is compressed. In this way, the fastener system can be used to securely clamp two structures to one another.

FIG. 15 shows another example of a fastener system 1500. The fastener system 1500, shown in FIG. 15, includes some components that are similar to those employed in the fastener system 100, shown in FIG. 1. For example, the fastener system 1500, shown in FIG. 15, includes a stud 1502, sleeve 1504, collet body 1506, and bushing 1508. The aforementioned components may have at least some similar contours and/or functions to those included in the fastener system 100, shown in FIG. 1. Therefore, redundant description is omitted. However, in the fastener system 1500, shown in FIG. 15, the collet body 1506 includes an interior threaded section 1510 that is configured to engage a threaded section 1512 in the stud 1502. On the other hand, the sleeve 1504 includes an unthreaded interior section 1514.

FIG. 16 shows a side view of the fastener system 1500 shown in FIG. 15 in an assembled state. Feet 1600 in the collet body are partially mated with the openings 1602 in the sleeve 1504 such that the feet do not protrude beyond the side of the sleeve. Viewing plane 1604 indicates the cross-sectional view shown in FIG. 17.

FIG. 17 shows a cross-sectional view of the fastener system 1500 shown in FIG. 16. The interior threaded section 1510 of the collet body 1506 is not engaged with the threaded section 1512 of the stud 1502, in the configuration shown in FIG. 17. However, it will be appreciated the said threading may occur when the stud is advanced into the collet body. It will also be appreciated that advancing the threading between the collet body 1506 and the stud 1502 will generate a clamping action similar to the clamping action described above with regard to FIGS. 1-14. Thus, the fastener system 1500 may also achieve decoupling of the shear stresses from the collet body. However, in the fastener system 1500, shown in FIG. 15, the cantilever legs 1507 of the collet body 1506 see two stress creating activities. The first stress being bending the legs open from a neutral position, similar to the first example of the fastener system, shown in FIG. 1. The second stress, corresponding to the addition of the interior threaded section 1510 in the collet body 1506, being clamping forces that are carried directly through the cantilever legs 1507 that already see stress from being bent open. These two stress creating activities are additive and thus may load the collet more than other configurations.

Figure 18:
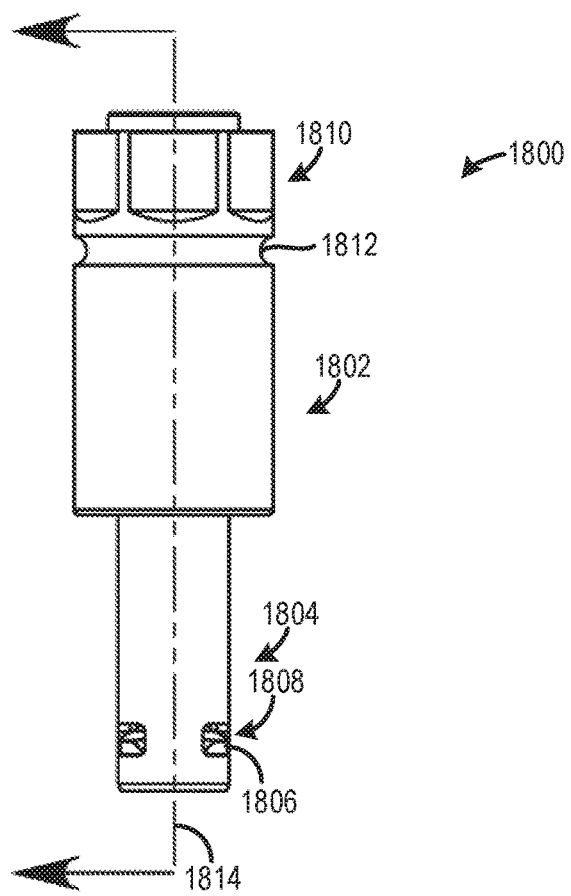
FIG. 18 shows a third example fastener system including an auxiliary structure.

FIG. 18 shows another example fastener system 1800 (e.g., removable fastener system) that includes an auxiliary structure 1802 at least partially enclosing a sleeve 1804. Feet 1806 are shown partially mated with openings 1808 in the sleeve 1804. The auxiliary structure 1802 further includes a facetted collar 1810 and detent 1812 configured to be gripped or held by a tool (e.g., automated tool). However, in other examples, the collar may not include a detent. Viewing plane 1814 defines the cross-sectional view depicted in FIG. 19.

Figure 19:
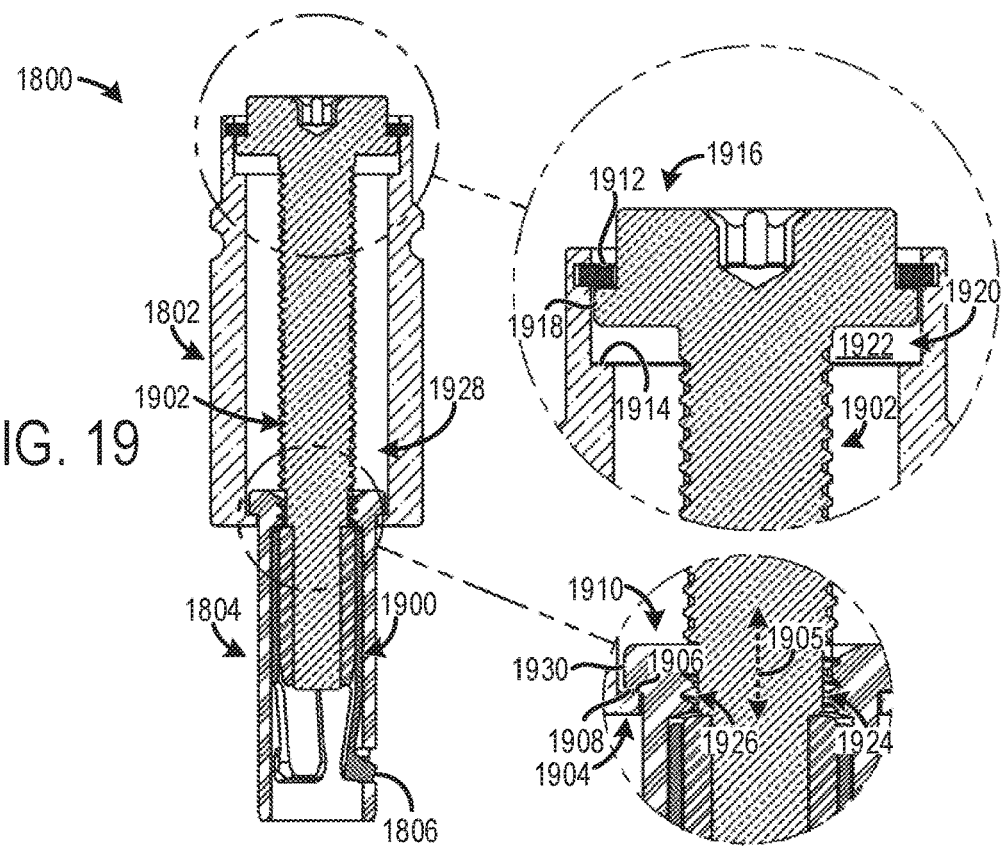
FIGS. 19 and 20 show a cross-section view of the fastening system, depicted in FIG. 18, in two states of disengagement.
Figure 20:
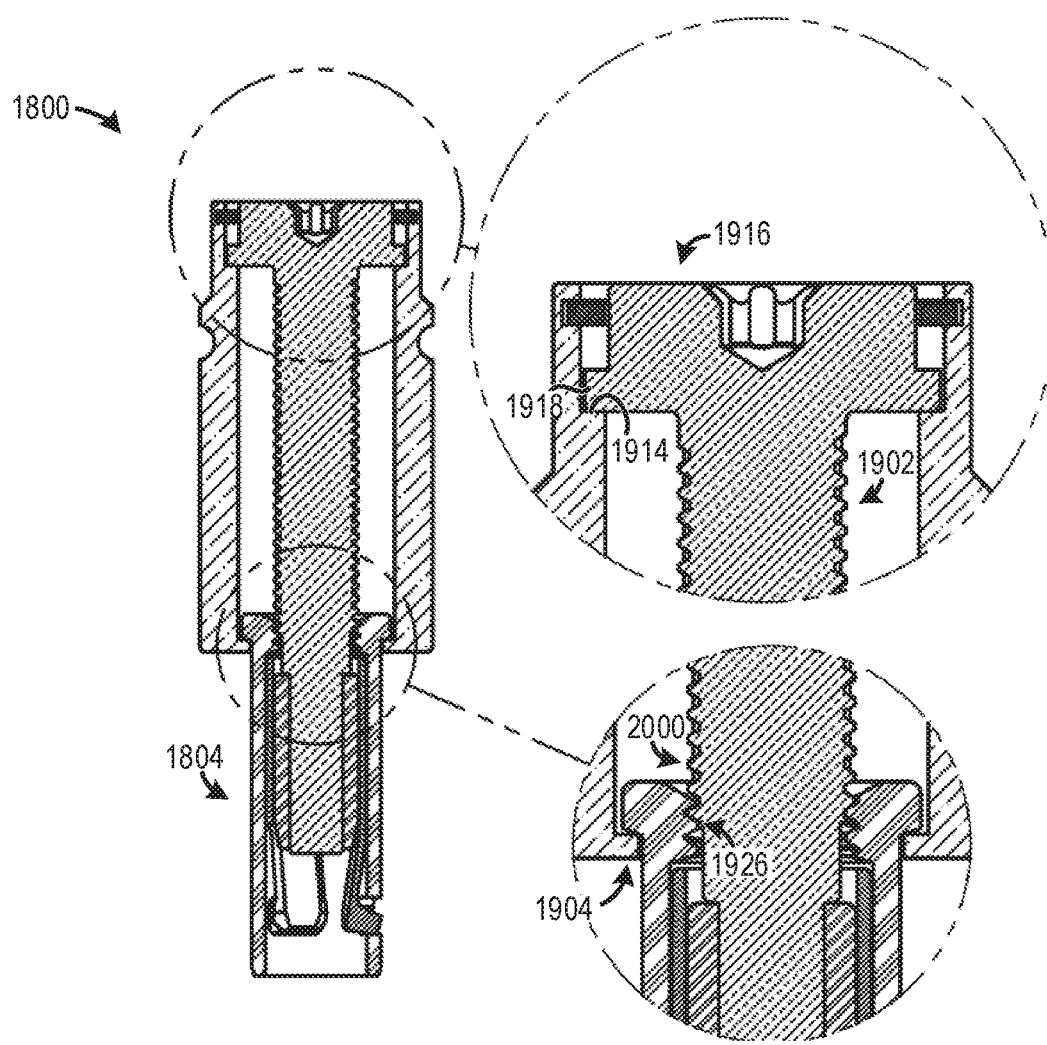

FIGS. 19 and 20 show a cross-sectional view of the fastener system 1800 shown in FIG. 18 in two stages of disengagement. FIG. 19 shows a collet body 1900 enclosed within the sleeve 1804. It will be appreciated that the sleeve 1804 and collet body 1900 may have similar characteristics or combinations of characteristics to those that are described herein with regard to the other fastener system examples. Thus, the sleeve 1804 and the collet body 1900 may interact (e.g., thread and unthread) with a stud 1902 to engage and disengage the feet 1806.

The auxiliary structure 1802 includes a lower lip 1904 extending inwardly toward a central axis 1905. The lower lip 1904 may have the shape of a lobe, hexagonal shelf, or other shape that inhibits axial movement of the collar of the sleeve 1804 beyond the lower end of the auxiliary structure. Specifically, an upper surface 1906 of the lower lip 1904 is shown in contact with a surface 1908 of a collar 1910 of the sleeve 1804. In this way, the fastener system 1800 may be self-contained, facilitating efficient tooling of the system. However, in other examples, the auxiliary structure 1802 may not include a lower lip 1904.

FIG. 19 additionally depicts the stud 1902 partially enclosed by the auxiliary structure 1802. The auxiliary structure 1802 includes an upper stop 1912 and a lower stop 1914 limiting the axial movement of the stud 1902. In particular, a head 1916 of the stud 1902 includes a protrusion 1918 that is delimited by the upper and lower stops, 1912 and 1914. In this way, the head 1916 of the stud 1902 may be kept within the auxiliary structure 1802 to reduce the profile of the fastener system 1800 and protect the head of the stud. It will also be appreciated that the interior portion 1920 in the auxiliary structure where the head 1916 of the stud 1902 resides enables rotation of the head 1916. For instance, the interior portion 1920 may be cylindrical in shape and have a larger diameter than the head 1916.

In FIG. 19 a gap 1922 is shown between the lower stop 1914 and the head 1916. The gap 1922 accommodates axial movement of the head when the stud 1902 is fully disengaged from the sleeve 1804 and collet body 1900. Movement of the head upwards allows the unthreaded section 1924 of the stud 1902 to align with the interior threaded section 1926 of the sleeve 1804, enabling free rotation of the stud with regard to the sleeve.

An interior portion 1928 of the auxiliary structure 1802 may be configured to allow axial movement the sleeve there through but limit (e.g., inhibit) rotation of the sleeve 1804. Such functionality may be achieved by contouring the interior portion such that a facetted collar 1930 of the sleeve 1804 mates therein. For instance, the interior portion and the facetted collar may have associated hexagonal shapes.

FIG. 20 shows the fastener system 1800 with the head 1916 of the stud 1902 driven downward into contact with the lower stop 1914. Specifically, the protrusion 1918 in the head 1916 may be in contact or near contact with the lower stop 1914. Driving the stud downward also induces engagement between a threaded section 2000 of the stud 1902 and the interior threaded section 1926 of the sleeve 1804. FIG. 20 also shows the auxiliary structure 1802 with the lower lip 1904 functioning to retain the sleeve 1804, as previously mentioned.

Figure 21:
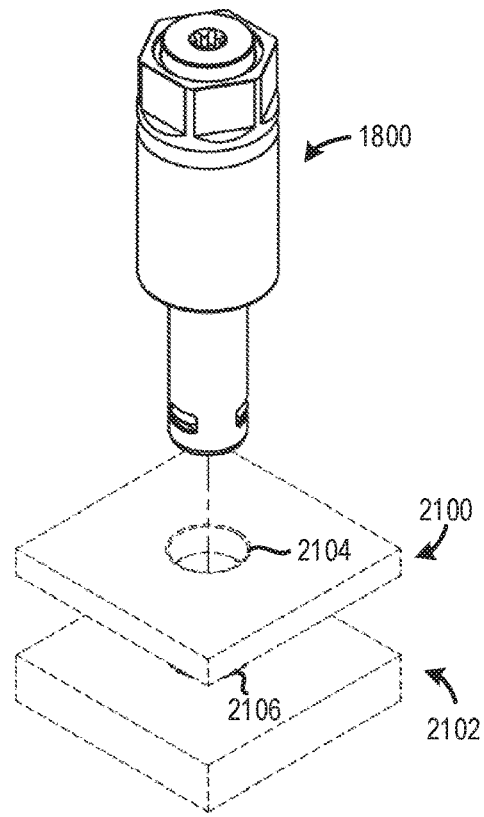
FIGS. 21 and 22 show a sequence of tooling steps where the third fastener system is used to clamp two structures together.

FIG. 21 shows the fastener system 1800, illustrated in FIGS. 18-20 prior to clamping an upper structure 2100 to a lower structure 2102. Again both the upper and lower structures include bores 2104 and 2106, respectively. FIG. 22 depicts a lower surface 2200 of the auxiliary structure 1802 in contact with the upper structure 2100. The lower auxiliary structure surface 2200, therefore, acts as an upper clamping surface. As in the case of the previous fastener examples, upper surfaces 2202 of feet 1806 function as a lower clamping surface.

FIG. 22 also shows the stud 1902 with a lower unthreaded section 2204 that may have a greater diameter than an upper threaded section 2206. However, the lower unthreaded section 2204, in other examples, may have a diameter that is smaller than or equal to the diameter of the upper threaded section 2206. Furthermore, the lower unthreaded section 2204 has a diameter 2203 that is greater than an inner diameter 2205 of a threaded section 2207 of the sleeve 1804. In this way, the fastener system 1800 may be locked together and act as a self-contained system. As a result, the system may be easily grasped and pulled out of a bore. The lower unthreaded section 2204 smoothly urges the cantilever legs 2208 outward with reduced abrasion when the slid there through. The lower unthreaded section 2204 is attached (e.g., press fit, braised, bonded, threaded, etc.,) to the stud 1902 as a separate component, in the illustrated example. The lower unthreaded section 2204 therefore acts as an elongated bushing and performs a similar function. However, in other instances, the lower unthreaded section 2204 may include of a region without threads on the stud 1902, a bushing, an elongated bushing, or any combination of bushings and regions without threads. Furthermore, as previously discussed, in other examples, the collet body 1900 may alternatively include the threaded section that engages with the stud.

FIG. 23 illustrates another example of a fastener system 2300. The fastener system 2300, shown in FIG. 23, again includes a stud 2302, an auxiliary structure 2304, a sleeve 2306, and a collet body 2308. It will be appreciated that the stud 2302, sleeve 2306, and collet body 2308 may have any of the features or combinations of the features of the studs, sleeves, and collet bodies in any of the fastener systems described herein.

However, in FIG. 23 the auxiliary structure 2304 includes an upper stop 2310 and a lower stop 2312 that substantially inhibit axial movement of the head 2314 of the stud 2302. Thus, the upper stop 2310 is nearly in contact with an upper surface 2316 of the head 2314 while the lower stop 2312 is in contact with a lower surface 2318 of the head 2314. Thus, a small gap may exist between the upper stop 2310 and the head 2314 that may be necessitated by manufacturing constraints, in some examples. This type of fastener system may be desirable in applications with packaging constraints. For example, it may be desirable in some applications to diminish the vertical profile of the system. Furthermore, the configuration of the fastener system, shown in FIG. 23, does not free spin in reverse. Free spin is an optional feature of the fastener system that enables the stud 2302 to freely rotate with regard to the sleeve 2306 and the collet body 2308 when the stud is completely unthreaded from the sleeve, as previously discussed. A fastener system configuration that does not free spin in reverse may be desired by some robotic manufacturers, due to the fact that some robots, in reverse, will sense the spike in torque, referred to as a hard-stop, when the fastener bottoms out (e.g., goes solid and acts as if everything is fixedly coupled together) in reverse.

It will be appreciated that in some instances the hard stop feature of the fastener may be included in any of the examples of the fastener system or combinations of the fastener systems, described herein. The bottoming out of the fastener is shown in the detail view of the threads engagement in FIG. 23. FIG. 23 also shows the auxiliary structure 2304 including a lower lip 2320 functioning to retain the sleeve 2306, as previously mentioned.

FIG. 24 shows another example of a fastener system 2400 and FIG. 25 shows a cross-section of the fastener system. Viewing plane 2402 denotes the cross-sectional view shown in FIG. 25. As depicted in FIG. 25, the fastener system 2400 includes an auxiliary structure 2500 with a stop 2502 preventing a head 2504 of a stud 2506 from traveling into an interior portion 2508 of the auxiliary structure 2500. It will be appreciated that an interior surface 2510 of the stop 2502 is unthreaded, in the depicted example. Therefore, the auxiliary structure may slide up and down freely with regard to the stud 2506 and a sleeve 2512. However in other instances, the stop 2502 may have an interior threaded section. FIG. 25 also shows the auxiliary structure 2500 including a lower lip 2532 functioning to retain the sleeve 2512, as previously mentioned. FIG. 25 additionally shows the fastener system 2400 including a collet body 2516 that may have at least some of the features, functions, etc., of the other collet bodies described herein. FIG. 25 also shows a bushing 2530. The bushing 2530 and the lower lip 2532 may function similarly to the previously described bushings and lower lips. FIG. 25 shows the fastener system 2400 in a disengaged configuration where the stud 2506 is not threaded into the sleeve 2512. However, in the fastener system 2400 when the stud 2506 is threaded into the sleeve, in an engaged configuration, the head 2504 of the stud 2506 moves closer to (e.g., axially translate in a downward direction) the stop 2502. Specifically, in some examples, when the stud 2506 is fully threaded into the sleeve 2512 the head 2504 of the stud may come into contact with the stop 2502. Moreover, during the initial phase said threading (e.g., prior to the head 2504 contacting the stop 2502) the relative position of the auxiliary structure 2500 and the sleeve 2512 may remain unchanged, in some examples. However, during a later phase in said threading (e.g., subsequent to the head 2504 contacting the stop 2502) the sleeve 2512 may axial translate upwards into the auxiliary structure 2500. It will be appreciated that this feature may be included in any of the examples of the fastener system or combinations of the fastener systems, described herein.

FIG. 26 shows an example of a sleeve 2600 and collet body 2602 that may be included in any of the fastener systems described herein. As shown, the sleeve 2600 includes two openings 2604 and the collet body 2602 includes two cantilever legs 2606 while the previous embodiments of the fastener system include three sleeve opening and corresponding cantilever legs. However, fasteners with a lower or greater number of openings and cantilever legs have been envisioned.

FIG. 27 shows another example fastener system 2700 where a stud 2702 includes an upper threaded section 2704, an unthreaded section 2706, and a lower threaded section 2708. In the engaged configuration shown in FIG. 27, the lower threaded section 2708 urges cantilever legs 2710 outward through openings 2712 in a sleeve 2714. Specifically in the example illustrated in FIG. 27, the lower threaded section 2708 extends to an end 2716 of the stud 2702. However, in other instances, the lower threaded section 2708 may not fully extend down the stud 2702.

FIGS. 28-33 show another embodiment of a fastener system 2800. It will be appreciated that the fastener system 2800 may include at least a portion of the structural and/or functional features of any of the fastener systems described herein. Moreover, combining features from three or more fastener systems have also been envisioned.

Figure 28:
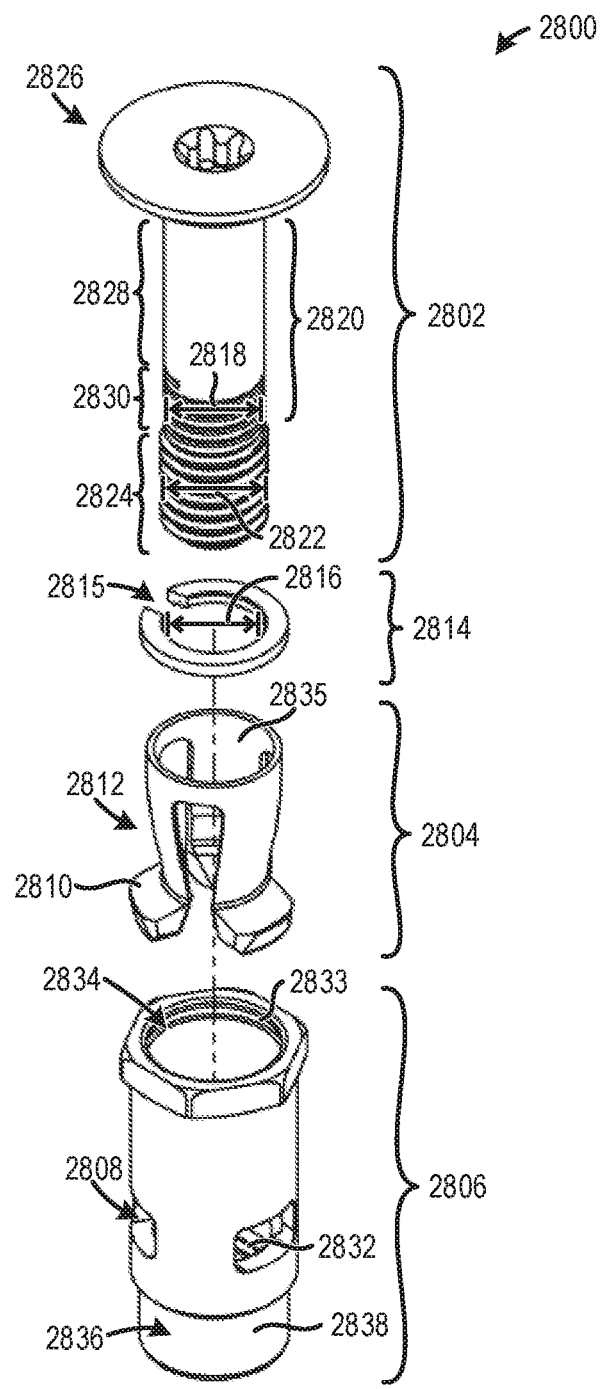
FIGS. 28-33 show a seventh example fastener system including a retaining ring.

FIG. 28 shows an exploded view of the fastener system 2800. The fastener system 2800 again includes a stud 2802, a collet body 2804, and a sleeve 2806. The sleeve 2806 includes openings 2808 designed to mate with feet 2810 of cantilever legs 2812 in the collet body 2804 when the fastener system 2800 is assembled and clamping upper and lower structures (e.g., work pieces).

Additionally, the fastener system 2800 includes a locking ring 2814. The locking ring 2814 is designed to retain the stud 2802 and collet body 2804 within the sleeve 2806. The locking ring 2814 includes a slit 2815 allowing for expansion/contraction of the locking ring during fastener assembly. In this way, fastener assembly may be simplified and efficiently carried out. In the depicted example, the locking ring 2814 has an inner diameter 2816 that is greater than a diameter 2818 of a reduced diameter section 2820 of the stud 2802 and less than a diameter 2822 of a lower threaded section 2824 of the stud 2802. In this way, the reduced diameter section 2820 of the stud 2802 may travel axially with the sleeve 2806 while preventing the lower threaded section 2824 of the stud 2802 as well as a head 2826 of the stud from axially egress from the sleeve 2806. As such, the components in the fastener system can be kept together during installation and removal of the fastener. Therefore, the likelihood misplaced components during fastener installation and removal is reduced (e.g., prevented).

The lower threaded section 2824 of the stud 2802 may, in one example, be a fully formed thread that forms an angle at a crest. However, in other examples, the lower threaded section 2824 may be a truncated thread. The truncation adds strength to the crest of the threads. Such strength may be beneficial and toughen the threads when they are pushing against the cantilever legs 2812 of the collet body 2804. Furthermore, by providing a stud with an expanded diameter section at the end of the stud 2802 away from the head as opposed to a bushing, the strength of the stud may be increased and the assembly of the fastener system may be simplified, thereby reducing manufacturing costs.

In the illustrated example, the reduced diameter section 2820 of the stud 2802 includes an unthreaded section 2828 and a threaded section 2830. In the illustrated example, the diameters of the threaded section 2830 and the unthreaded section 2828 of the reduced diameter section 2820 of the stud 2802 are equivalent. However, in other examples, the diameter along the reduced diameter section of the stud may vary along its length. In other examples, the reduced diameter section may not be threaded.

In the example, shown in FIG. 28, the sleeve 2806 includes a lower threaded section 2832 and an upper threaded section 2833 designed to threadingly engage with the lower threaded section 2824 of the stud 2802. The lower threaded section 2832 and the upper threaded section 2833 are positioned in an aperture 2834 of the sleeve 2806. Both of the threaded sections may be designed to threadingly engage with the lower threaded section 2824 of the stud 2802. It will be appreciated the sleeve 2806 may include either the upper threaded section or the lower threaded section, in other examples. On the other hand, the collet body 2804 does not include a threaded section and in contrast includes an unthreaded interior surface 2835. However, as previously discussed, in some configurations, the collet body 2804 may include a threaded section threadingly engaging with the stud 2802.

The sleeve 2806 also includes a lower reduced diameter section 2836 having an unthreaded outer surface 2838. The lower reduced diameter section 2836 may protect the stud 2802 during installation/removal of the fastener system 2800, for example.

Figure 29:
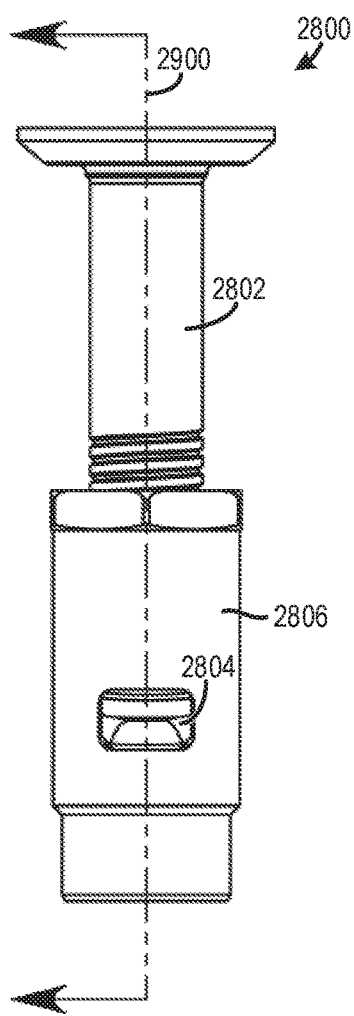

FIG. 29 shows an assembled view of the fastener system 2800. Again, the stud 2802, collet body 2804, and sleeve 2806 are illustrated. It will be appreciated that the fastener system 2800 shown in FIG. 29 is in a disengaged configuration. A viewing plane 2900 defining the cross-sectional view shown in FIG. 30 is depicted in FIG. 29.

Figure 30:
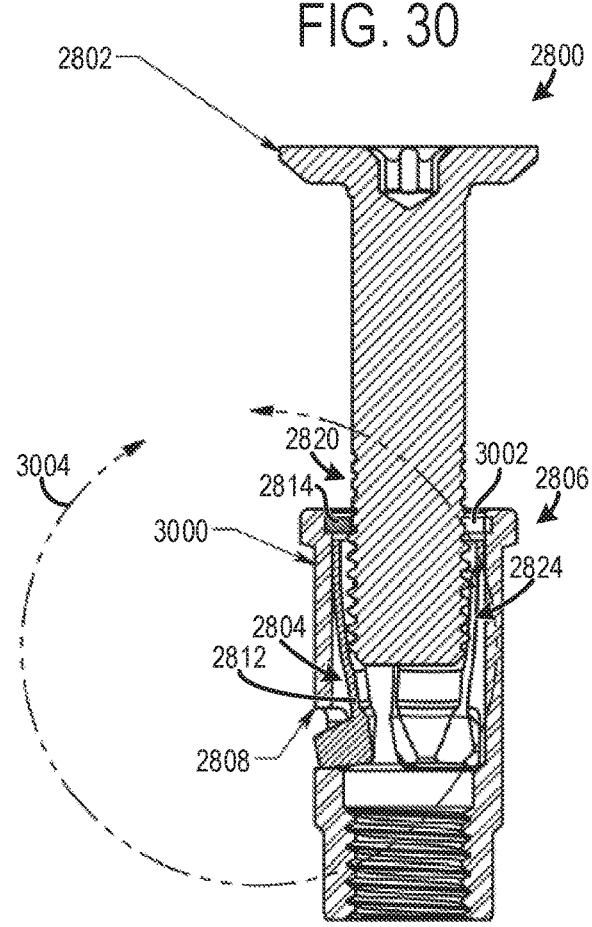

FIG. 30 shows a cross-sectional view of the fastener system 2800. The stud 2802, collet body 2804, and sleeve 2806 are again shown. The sleeve 2806 includes a body 3000 having the openings 2808, in the illustrated example. The locking ring 2814 is also shown in FIG. 30. As illustrated, the locking ring 2814 is positioned in a recess 3002 of the sleeve 2806. As shown, the locking ring 2814 at least partially circumferentially surrounds the reduced diameter section 2820 of the stud 2802 and limits axial movement of the threaded section 2824 of the stud 2802 beyond the central aperture of the sleeve 2806.

Cantilever legs 2812 of the collet body 2804 are also shown in FIG. 30. The cantilever legs 2812 are in a neutral position in FIG. 30. Specifically, the cantilever legs 2812 extend inward in the neutral position. As such, the cantilever legs 2812 may flex outwardly when mated with openings 2808 in the sleeve 2806. However, other neutral leg positions have been envisioned. The enlarged area in FIG. 31 is indicated at 3004.

Figure 31:
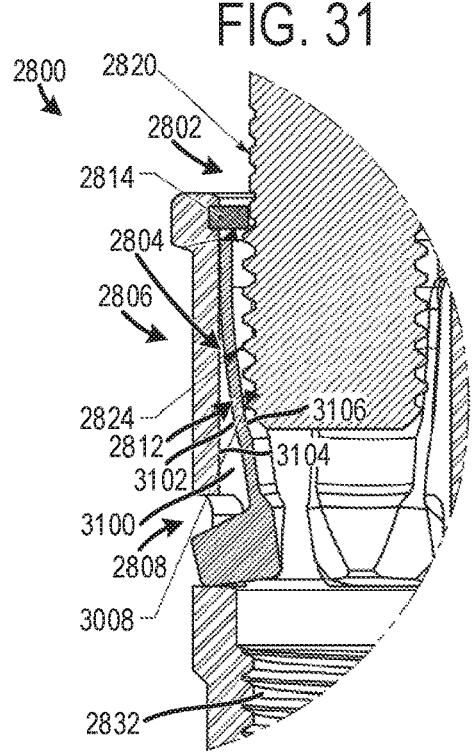

FIG. 31 shows an enlarged view of a portion of the fastener system 2800. The threaded section 2824 of the stud 2802 is shown in contact with the cantilever legs 2812 of the collet body 2804. Additionally, the cantilever legs 2812 are shown positioned in openings 2808 in the sleeve 2806. As show, a gap 3100 exist between a portion of an outer surface 3102 of the cantilever legs 2812 and an interior surface 3104 of the sleeve 2806.

The locking ring 2814 in the fastener system 2800 is also shown in FIG. 31. The locking ring 2814 is shown contacting the threaded section 2824 of the stud 2802. In this way, the locking ring 2814 may limit the axial movement of the stud 2802, thereby retaining components in the system. However, it will be appreciated that the locking ring 2814 allows the reduced diameter section 2820 to axial translate with regard to the ring, allowing for the intended clamping action in the system.

The threaded section 2824 of the stud 2802 is also shown contacting interior surfaces 3106 of the cantilever legs 2812. It will be understood that downward movement of the threaded section 2824 of the stud 2802 further expands the cantilever legs 2812. The threads 3008 in the threaded section 2824 may be fully formed, in one example. However, in other examples, the threads 3008 in the threaded section 2824 may be truncated.

The lower threaded section 2832 of the sleeve 2806 is also shown in FIG. 31. As previously discussed, the lower threaded section 2832 of the sleeve 2806 mates with the lower threaded section 2824 of the stud 2802.

Figure 32:
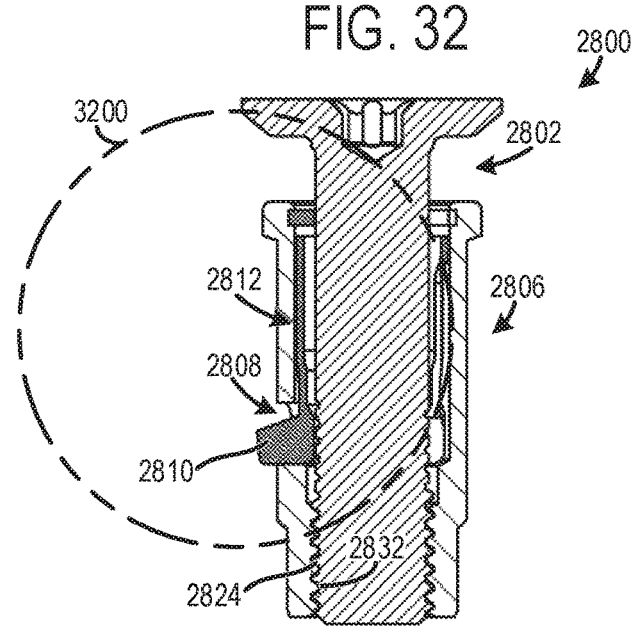

FIG. 32 shows a cross-sectional view of the fastener system 2800 in an engaged configuration where the feet 2810 of the cantilever legs 2812 extend through the openings 2808 in the sleeve 2806. It will be appreciated that threading the lower threaded section 2824 of the stud 2802 into the lower threaded section 2832 of the sleeve 2806 places the fastener system 2800 in the engaged configuration. The enlarged area in FIG. 33 is indicated at 3200.

Figure 33:
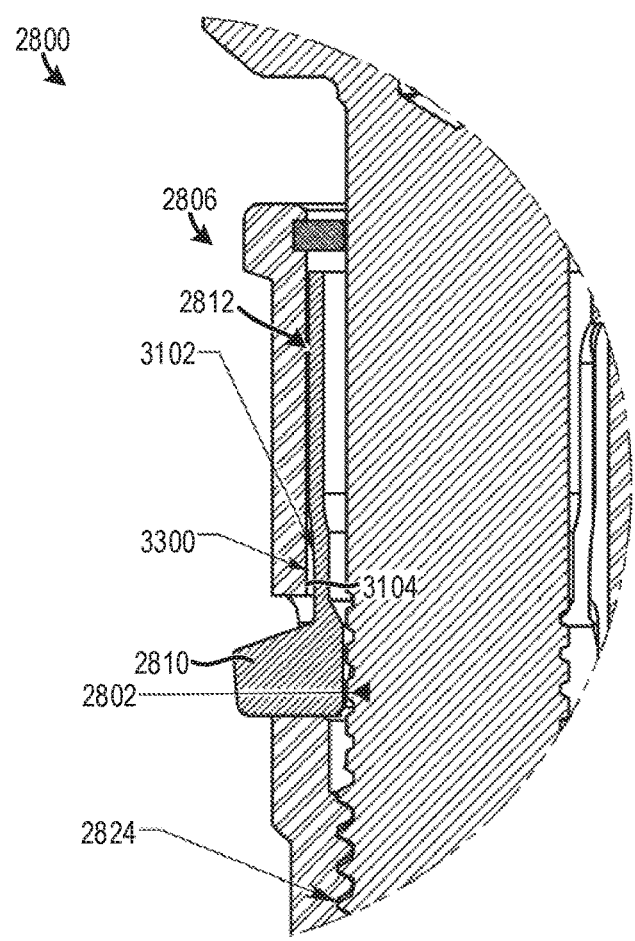

FIG. 33 shows a detailed view of a portion of the fastener system 2800. As shown, a gap 3300 exist between the outer surface 3102 of the cantilever legs 2812 and the interior surface 3104 of the sleeve 2806. This clearance zone allows the cantilever legs 2812 to expand to a greater diameter when interacting with the lower threaded section 2824 of the stud 2802. In this way, mechanical binding and leg deformation caused by over-extension of the cantilever legs 2812 may be avoided. Furthermore, designing the cantilever legs 2812 in this manner allows the legs to be repeatedly expanded and contracted as the stud 2802 is threaded/unthreaded into/from the sleeve 2806 without permanent deformation.

Furthermore, the feet 2810 are in contact with the lower threaded section 2824 (e.g., reduced diameter section) of the stud 2802, in the illustrated example. Such an arrangement may provide a desired load distribution in the fastener system. For instance, a large amount (e.g., the majority) of the loads experienced by the fastener may be transferred to the sleeve, in such a configuration. As such, transfer of the loads to selected sections in the fastener allows the fastener to be designed with increased load carrying capabilities and reduces the likelihood mechanical binding, leg degradation (e.g., permanent deformation, failure, etc.), etc.

FIGS. 34-37 show an engagement sequence (e.g., clamping up sequence) in a fastener system 3400. FIGS. 34-37 show the fastener system 3400 including the stud 3402, collet body 3404 with cantilever legs 3406 having feet 3407 and a sleeve 3408 with openings 3410. Specifically, FIGS. 34-37 specifically show the fastener system 3400 in various stages of increasing clamping engagement. It will be appreciated that threading the stud further into the sleeve provides increasing fastener clamping engagement.

As shown in FIG. 34, the stud 3402 begins pushing the feet 3407 of the cantilever legs 3406 through the openings 3410. As the stud 3402 is advanced with regard to the sleeve 3408, induced via stud rotation, the cantilever legs 3406 are moved further outward to facilitate structure (e.g., work piece) clamping. Additionally, a gap 3412 exists between an inner surface 3416 of the sleeve 3408 and surfaces 3418 of the cantilever legs 3406. As the fastener system 3400 is transitioned into an engaged configuration the size of the gap 3412 changes due to the flexion characteristics of the cantilever legs 3406.

FIG. 35 shows the feet 3407 of the cantilever legs 3406 extending further through the openings 3410. An increased diameter section 3500 of the stud 3402 pushes the feet 3407 of the cantilever legs 3406 further outward. In the configuration shown in FIG. 35 the legs are over-expanded as the legs interact with the increased diameter section of the stud. In other words, the legs radially expand beyond a clamping position. FIG. 35 also depicts a smaller gap between the cantilever legs 3406 and the inner surface 3416 of the sleeve 3408 when compared to the configuration of the fastener system in FIG. 34. It will be appreciated that the smaller gap is caused by increased outward flexion in the cantilever legs 3406.

The increased diameter section 3500 of the stud 3402 has a larger diameter than a reduced diameter section 3502 of the stud 3402. In one example, the reduced diameter section 3502 of the stud 3402 may be unthreaded. However, in other examples, the reduced diameter section 3502 of the stud 3402 may include a threaded section and an unthreaded section, as previously discussed. Furthermore, the increased diameter section 3500 of the stud 3402 may be threaded.

FIG. 36 shows the feet 3407 of the cantilever legs 3406 extending through the openings 3410 in the sleeve 3408. As such, a portion of the outer surfaces 3418 of the cantilever legs 3406 are in face sharing contact with the inner surface 3416 of a lower structure 3600.

FIG. 37 shows the fastener system 3400 in an engaged configuration that clamps a lower structure 3600. Specifically, an upper surface 3700 of the feet 3407 is in contact with an outer surface 3702 with the lower structure 3600. As previously, discussed the fastener system 3400 may clamp an upper structure (not shown). In the clamping configuration of the fastener system 3400, shown in FIG. 37 a large amount of shear stress is transferred from the cantilever leg feet 3407 to the sleeve 3408. In this way, the shear stress is essentially decoupled from the collet body 3404. As such, a more robust fastener is provided which efficiently transfers these stresses to selected components in the system designed to carry the loads. The likelihood of fastener degradation as well as the stresses impeding the intended operation of the fastener is therefore substantially reduced.

FIGS. 38-42 show another example of a fastener system 3800. The fastener system 3800 again includes a stud 3802, a collet body 3804, a sleeve 3806, and a bushing 3808.

Figure 38:
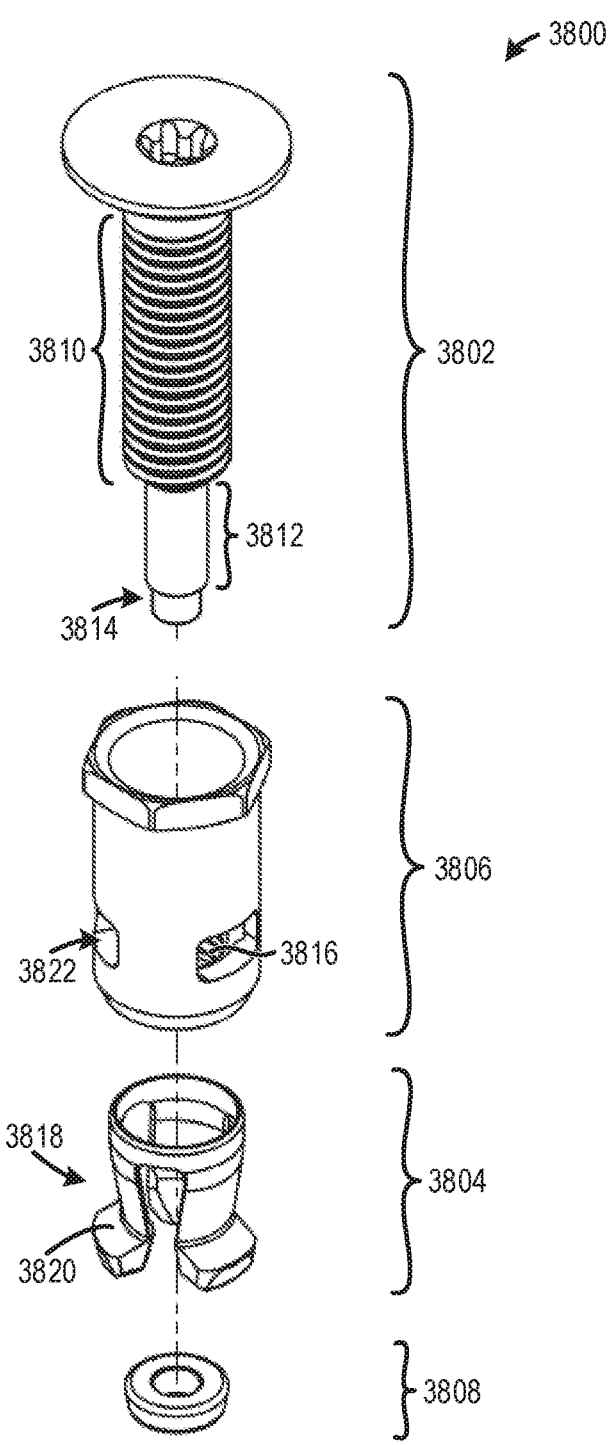

FIG. 38 specifically shows the stud 3802 including a threaded section 3810 and a first unthreaded section 3812 (e.g., decreased diameter unthreaded section) and a second unthreaded section 3814 (e.g., increased diameter unthreaded section). When assembled the bushing 3808 may be mated with the second unthreaded section 3814 of the stud 3802. It will be appreciated that the first unthreaded section 3812 of the stud functions to allow the stud 3802 to spin freely when backed out of a threaded section 3816 of the collet body 3804. Again, cantilever legs 3818 in the collet body 3804 are shown including feet 3820. When assembled, the feet 3820 extend into openings 3822 in the sleeve 3806. The degree to which the fastener system 3800 is clamped up dictates the degree to which the feet 3820 extend through the openings 3822 in the sleeve 3806, as previously discussed.

FIG. 39 shows an assembled view of the fastener system 3800, shown in FIG. 38. A viewing plane 3900 defining the cross-sectional view shown in FIGS. 40-43, is indicated in FIG. 39.

FIG. 40 shows the first unthreaded section 3812 of the stud 3802 in axial alignment with the threaded section 3816 of the collet body 3804. As such, the stud 3802 may freely spin with regard to the collet body 3804. In this way, the chance of damaging the fastener when unclamping the fastener is reduced. For instance, when the stud 3802 is unthreaded from the sleeve 3806 the second unthreaded section will align with the threaded section 3816 of the sleeve 3806. Consequently, the stud 3802 will freely rotate with regard to the sleeve 3806. As a result, axial separation between the stud 3802 and the sleeve 3806 is essentially limited to prevent the bushing 3808 from being damaged.

Additionally, the bushing 3808 and threaded section 3810 of the stud 3802 work in conjunction with the second unthreaded section 3814 of the stud 3802 and cantilever legs 4000 to collectively trap and lock the components in the fastener together.

FIG. 41 shows a detailed view of a section of the fastener system 3800 shown in FIG. 40. FIG. 41 shows the diameter 4100 of the threaded section 3810 of the stud 3802 exert an axial force on the cantilever legs 3818 responsive to rotation of the stud via installation personnel operating a manual tool or an automated tooling apparatus.

Figure 42:
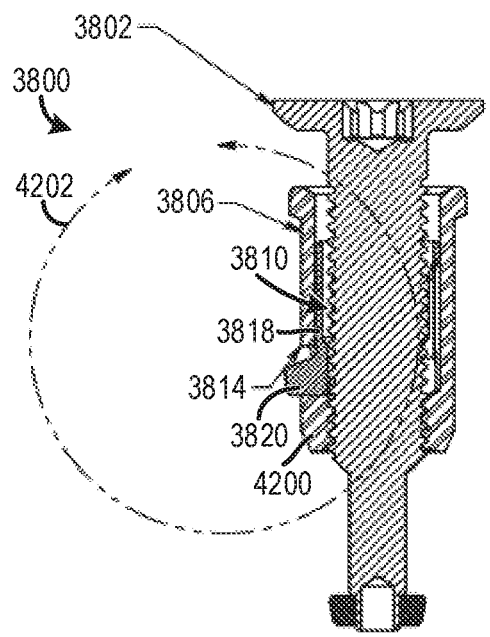

FIG. 42 shows the fastener system 3800 with the stud 3802 further rotated into the sleeve 3806. Responsive to the axial translation of the stud 3802 with regard to the sleeve 3806, the threaded section 3810 of the stud 3802 pushes the feet 3820 of the cantilever legs 3818 through the openings 3822 in a body 4200 of the sleeve 3806. The enlarged area in FIG. 43 is indicated at 4202.

Figure 43:
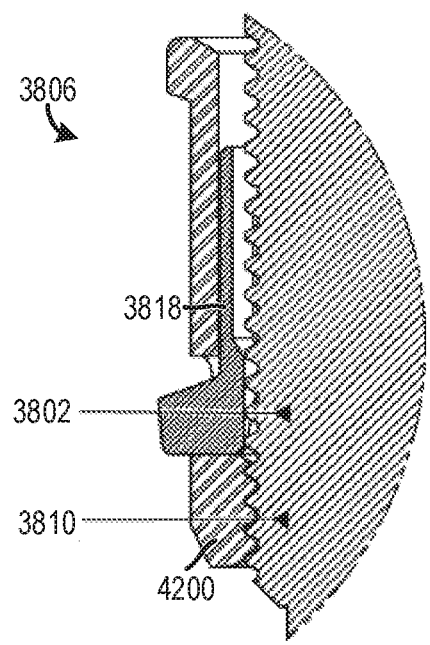

FIG. 43 shows a detailed view of the fastener system 3800, shown in FIG. 42. As shown, the cantilever legs 3818 are nominally opened and riding on the stud 3802. It will be appreciated that the configuration of the fastener system 3800 shown in FIG. 43 may be a desirable load-carrying configuration. In such a configuration the threaded section 3810 of the stud 3802 fully engages (e.g., fully engages) with the threaded section 3816 of the body 4200 of the sleeve 3806.

FIGS. 44-47 show another example of a fastener system 4400. The fastener system 4400 again includes a stud 4402, a collet body 4404, and a sleeve 4406. The stud 4402 in the system includes an upper unthreaded section 4410, an upper threaded section 4408, a lower unthreaded section 4412, and a lower threaded section 4414.

Figure 44:
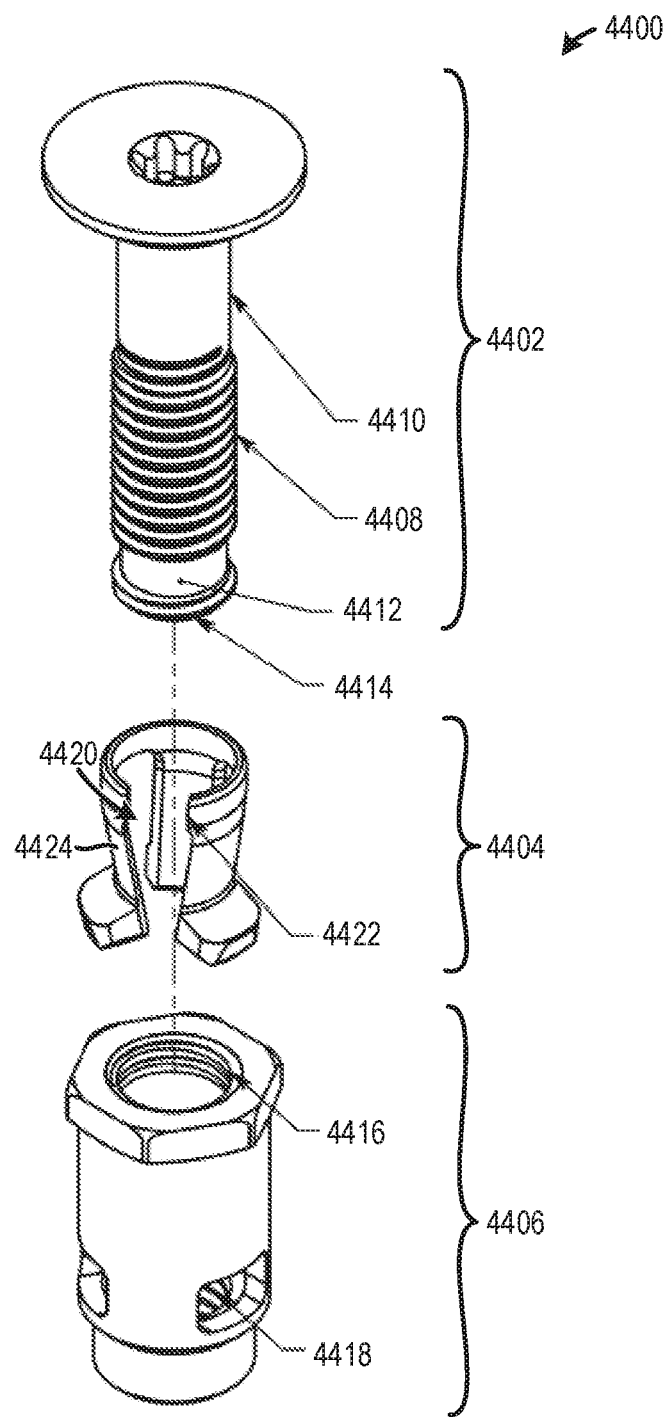
FIGS. 44-47 show a tenth example fastener system with a split collet body.

FIG. 44 shows the sleeve 4406 including an upper threaded section 4416 and a lower threaded section 4418. Both the threaded sections 4416 and 4418 of the sleeve 4406 are included in an interior aperture of the stud 4402.

The collet body 4404 includes a slit 4420. Surfaces 4422 of the collet body 4404 define the boundary of the slit 4420. In the depicted example, the surfaces 4422 extend down sides of cantilever legs 4424 of the collet body 4404. It will be appreciated that the slit 4420 is circumferentially positioned between two of the cantilever legs 4424 of the collet body 4404, in the illustrated example. However, slit 4420 may have other profiles, in other examples. For instance, the slit may extend down a leg in the collet body, splitting the leg in two. The slit 4420 may accommodate radial expansion and retraction of the stud 4402 during installation and removal of the fastener system 4400. Specifically, it will be appreciated that the split collet body 4404 may help facilitate insertion of the collet body into the sleeve 4406. This may be particularly useful when the sleeve 4406 includes both an upper and lower threaded section that axially protrude into the central aperture in the sleeve 4406. It will be appreciated that the lower threaded section 4414 of the stud 4402 interacts with cantilever legs 4424 to radially expand the legs when the fastener is brought into clamping engagement with work pieces.

Figure 45:
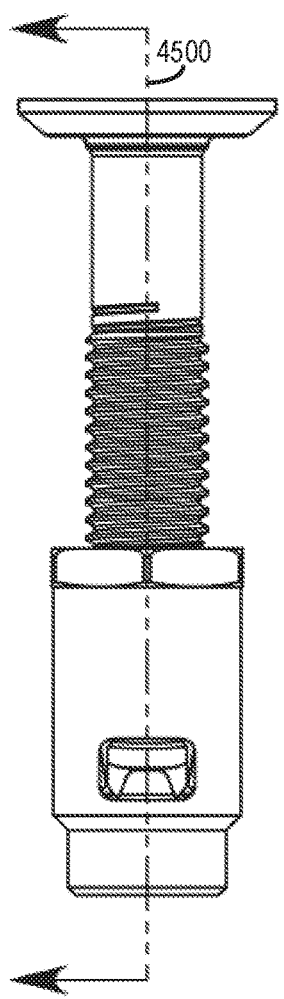

FIG. 45 shows an assembled view of the fastener system 4400. Viewing plane 4500 defines the cross-sectional view shown in FIGS. 45-46.

Figure 46:
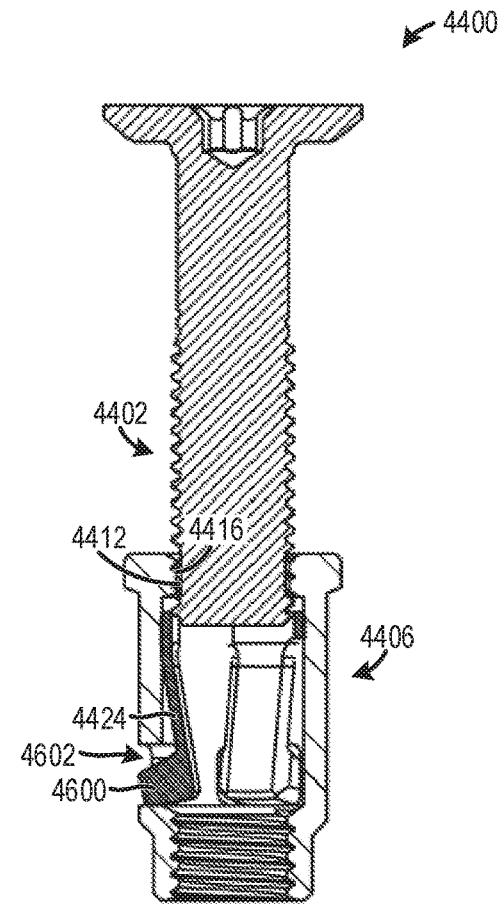

FIG. 46 shows the fastener system 4400 in an engaged configuration (e.g., clamping configuration). As shown, the lower unthreaded section 4412 of the stud 4402 is aligned with the upper threaded section 4416 of the sleeve 4406. As previously discussed, alignment between the unthreaded section 4412 of the stud 4402 and the upper threaded section 4416 of the sleeve 4406 allows the stud to freely rotate with regard to the sleeve 4406. To further engage the stud 4402 with the sleeve 4406 the stud must be moved axially downward with regard to the sleeve 4406 to initiate engagement between the upper threaded section 4408 of the stud 4402 and the upper threaded section 4416 of the sleeve 4406. In this way, the stud 4402 may be initially guided through the sleeve 4406 during an initial stage of fastener clamping. Additionally, the cantilever legs 4424 are in a neutral position in the configuration shown in FIG. 45. In such a configuration, feet 4600 of the cantilever legs 4424 only partially extend through openings 4602 in the sleeve 4406.

Figure 47:
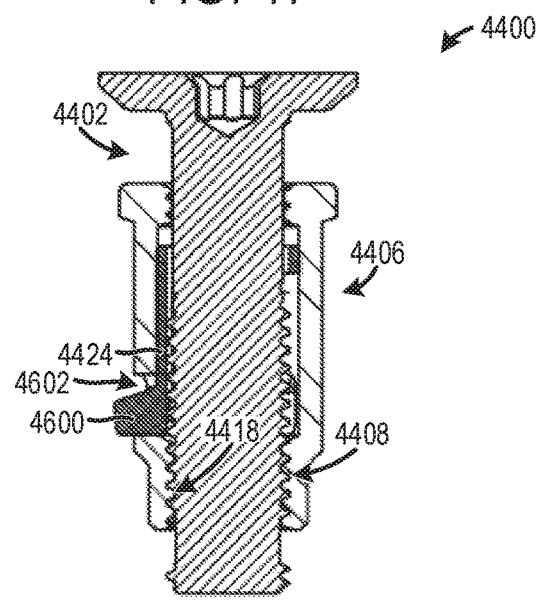
Figure 48:
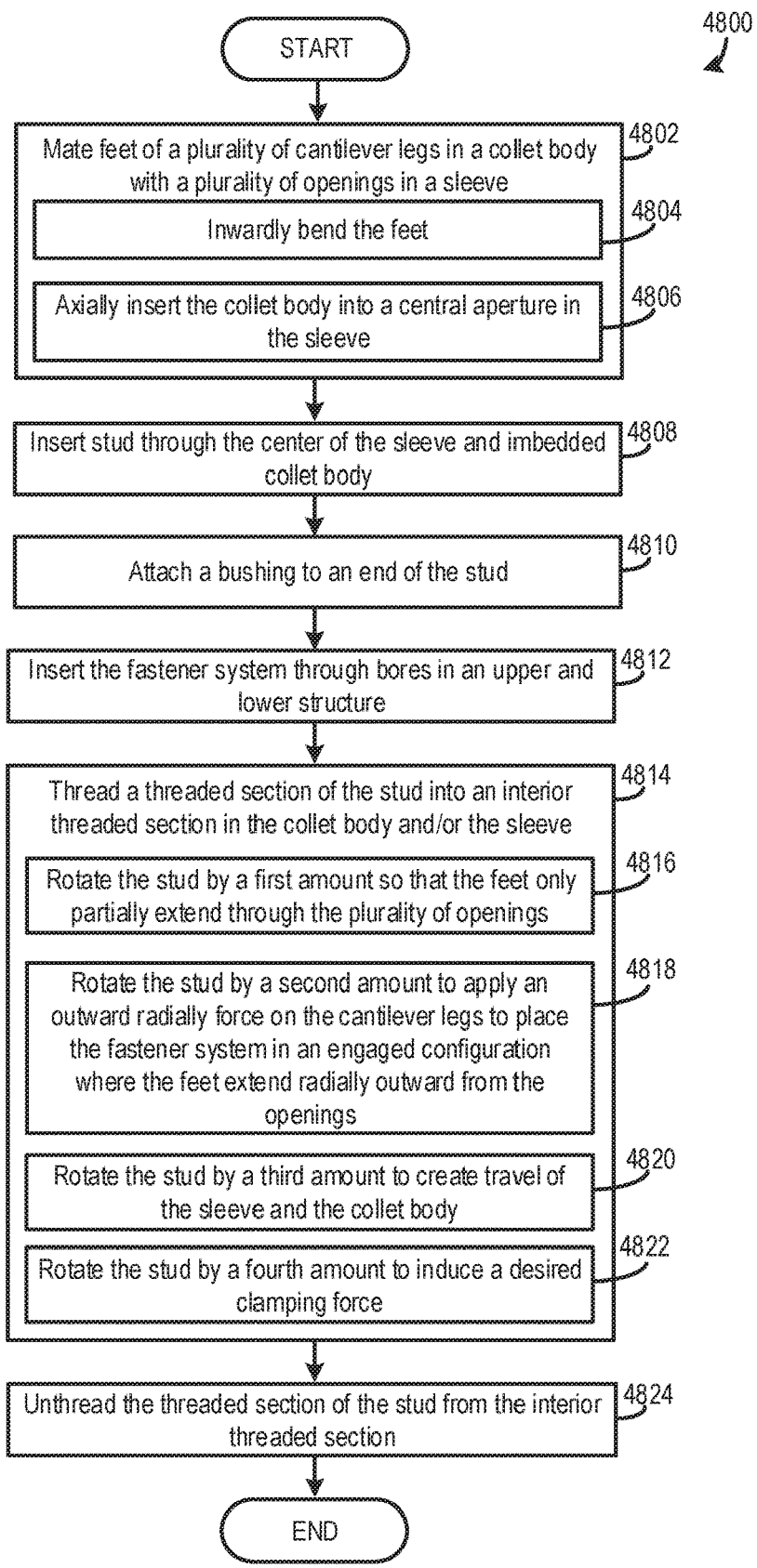
FIG. 48 shows a method for installing and removing a fastener system.

FIG. 47 shows the fastener system 4400 in an engaged configuration. As shown, the upper threaded section 4408 of the stud 4402 is interacting with the cantilever legs 4424 to expand the legs such that they radially extend through the openings 4602 in the sleeve 4406. In the fastener configuration in FIG. 47 the feet 4600 extend through the openings 4602 due to the outward flexion of the cantilever legs 4424 caused by the interaction between the upper threaded section 4408 of the stud 4402 and the cantilever legs. FIG. 47 also shows the upper threaded section 4408 of the stud 4402 in the fastener system 4400 engaging with the lower threaded section 4418 of the sleeve 4406.

FIGS. 1-47 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 48 shows a method 4800 for operating a fastener system. The method may be implemented by any of the fastener systems and tooling apparatus or combinations of the fastener systems and tooling apparatuses described above with regard to FIGS. 1-47. However, in other examples, the method may be implemented by other suitable fastener systems and/or tooling apparatuses.

Next at 4802 the method includes mating feet of a plurality of cantilever legs in a collet body with a plurality of openings in a sleeve in the fastener system. Such mating may include steps 4804 and 4806. At 4804 the method includes inwardly bending the feet and at 4806 the method includes axially inserting the collet body into a central aperture in the sleeve.

At 4808 the method includes inserting the stud through the center of the sleeve and imbedded collet body. Next at 4810 the method includes attaching a bushing to an end of the stud. Attaching the bushing to the stud may include welding, press fitting, braising, adhesively bonding, combinations thereof, etc.

At 4812 the method includes inserting the fastener system through bores in an upper and lower structure. At 4814 the method includes threading a threaded section of the stud into an interior threaded section in one of the collet body and the sleeve. This threading may include steps 4816-4822. At 4816 the method includes, rotating the stud by a first amount so that the feet only partially extend through the plurality of openings. In this way, the stud may be partially threaded into the sleeve without pushing the feet out of the openings. It will be appreciated that the fastener system is in a disengaged configuration in step 4816.

At 4818 the method includes rotating the stud by a second amount to apply an outward radially force on the cantilever legs to place the fastener system in an engaged configuration where the feet extend radially outward from the openings. Thus, the feet may clamp a lower structure while an upper section of the system, such as the stud head or auxiliary structure, may clamp an upper structure. At 4820 the method includes rotating the stud by a third amount to create travel of the sleeve and the collet body. Next at 4822 the method includes rotating the stud by a fourth amount to induce a desired clamping force. In this way, the fastener system may exert a targeted clamping force on the structures. It will be appreciated that the different stages of stud rotation may take place in succession (e.g., direct succession) during fastener engagement, in some examples.

At 4824 the method includes unthreading the threaded section of the stud from the interior threaded section. In one example, when the stud is unthreaded the stud may freely rotate within the collet body and the sleeve. The free rotation of the stud prevents damage caused by unthreading of the stud from the sleeve to a greater degree than is necessitated. However, in other examples, the fastener system may not be designed to enable free spin of the stud. In such an example, the stud may be unthreaded until a spike in toque is sensed by a tooling apparatus or a person.

The technical effect of providing a fastener system with openings in a sleeve and cantilever legs in a collet body having feet that mate with the openings is the decoupling of shear stressed from the collet body to enable quick, efficient, and unencumbered clamping and unclamping of the fastener system.

The invention will further be described in the following paragraphs. In one aspect, a fastener system is provided. The fastener system includes a sleeve including a sleeve opening, a collet body at least partially enclosed within the sleeve, the collet body including, a crown having a crown opening, and a first cantilever leg extending from the crown and including a foot configured to mate with the sleeve opening when the fastener system is in an engaged configuration, and a stud extending through the crown opening and including a threaded section engaging with an interior threaded section in at least one of the collet body and the sleeve.

In another aspect, a fastener system is provided. The fastener system includes a sleeve including a plurality of sleeve openings, a collet body including, a crown having a crown opening, and a plurality of cantilever legs extending from the crown, each of the plurality of cantilever legs including a foot configured to mate with one of the plurality of sleeve openings when the fastener system is in an engaged configuration, and a stud extending through the crown opening and including a threaded section engaging with an interior threaded section in the sleeve, where, in the engaged configuration, the stud exerts an outward force on the plurality of cantilever legs to push a portion of each of the feet outside of the corresponding sleeve opening.

In another aspect, a method for a fastener system is provided. The method includes mating feet of a plurality of cantilever legs in a collet body with a plurality of openings in a sleeve, and threading a threaded section of a stud into an interior threaded section in one of the collet body and the sleeve.

In another aspect, a fastener system is provided. The fastener system includes a sleeve including a sleeve opening, a collet body at least partially enclosed within the sleeve, the collet body including, a crown having a crown opening, and a cantilever leg extending from the crown and including a foot configured to mate with the sleeve opening when the fastener system is in an engaged configuration, and an auxiliary structure at least partially extending around the sleeve having an inner diameter that is greater than an outer diameter of the sleeve.

In another aspect, a fastener system is provided. The fastener system includes a sleeve including a sleeve opening, a collet body at least partially enclosed within the sleeve, the collet body including a crown having a crown opening, and a cantilever leg extending from the crown and including a foot configured to mate with the sleeve opening when the fastener system is in an engaged configuration, and a stud extending through the crown opening and including a threaded section engaging with an interior threaded section in the sleeve and an unthreaded section positioned below the threaded section, the unthreaded section allowing the stud to spin freely when the threaded section of the stud is unthreaded from the interior threaded section of the sleeve.

In another aspect, a fastener system is provided. The fastener system includes a sleeve including a plurality of sleeve openings; a collet body including a crown having a crown opening, and a plurality of cantilever legs extending from the crown, each of the plurality of cantilever legs including a foot configured to mate with one of the plurality of sleeve openings when the fastener system is in an engaged configuration, and a stud extending through the crown opening and including, a threaded section engaging with an interior threaded section in the sleeve, and a head positioned external to a central aperture in the sleeve when the fastener system is in the engaged configuration, and a bushing coupled to an end of the stud.

In another aspect, a fastener system is provided. The fastener system includes a sleeve including a sleeve opening, a collet body at least partially enclosed within the sleeve, the collet body including, a crown having a crown opening, and a cantilever leg extending from the crown and including a foot configured to mate with the sleeve opening when the fastener system is in an engaged configuration, an auxiliary structure at least partially extending around the sleeve and including an upper stop and a lower stop limiting axial movement of a head of a stud positioned at least partially the auxiliary structure.

In another aspect, a fastener system is provided. The fastener system includes a sleeve including a sleeve opening, a collet body at least partially enclosed within the sleeve, the collet body including a crown having a crown opening, and a cantilever leg extending from the crown and including a foot configured to mate with the sleeve opening when the fastener system is in an engaged configuration, and an auxiliary structure at least partially extending around the sleeve and including a lower lip extending radially inward to retain a collar of the sleeve in an interior portion of the auxiliary structure.

In another aspect, a fastener system is provided. The fastener system includes a sleeve including a sleeve opening, a collet body at least partially enclosed within the sleeve, the collet body including, a crown having a crown opening, and a cantilever leg extending from the crown and including a foot configured to mate with the sleeve opening when the fastener system is in an engaged configuration, and an auxiliary structure at least partially extending around the sleeve and including a lower lip extending radially inward to retain a collar of the sleeve in an interior portion of the auxiliary structure, and a stud extending through the crown opening and including, a threaded section engaging with an interior threaded section in at least one of the collet body and the sleeve, and a head extending above the auxiliary structure.

In yet another aspect, a fastener system is provided. The fastener system includes a sleeve including a sleeve opening, a collet body at least partially enclosed within the sleeve, the collet body including, a crown having a crown opening, and a cantilever leg extending from the crown and including a foot configured to mate with the sleeve opening when the fastener system is in an engaged configuration, an auxiliary structure at least partially extending around the sleeve and including a lower lip extending radially inward to retain a collar of the sleeve in an interior portion of the auxiliary structure, and a stud extending through the crown opening and including, a threaded section engaging with an interior threaded section in at least one of the collet body and the sleeve, and a head that does not extend above the auxiliary structure.

In yet another aspect, a fastener system is provided. The fastener system includes a sleeve including a sleeve opening, a collet body at least partially enclosed within the sleeve, the collet body including, a crown having a crown opening, and a cantilever leg extending from the crown and including a foot configured to mate with the sleeve opening when the fastener system is in an engaged configuration, an auxiliary structure at least partially extending around the sleeve and including a lower lip extending radially inward to retain a collar of the sleeve in an interior portion of the auxiliary structure, and a stud extending through the crown opening and including, a threaded section engaging with an interior threaded section in at least one of the collet body and the sleeve, and an unthreaded section positioned below the threaded section and configured to allow the stud to spin freely when in a disengaged configuration.

In another aspect a fastener system is provided. The fastener system includes a sleeve including a sleeve opening, a collet body at least partially enclosed within the sleeve, the collet body including, a crown having a crown opening, and a cantilever leg extending from the crown and including a foot configured to mate with the sleeve opening when the fastener system is in an engaged configuration, an auxiliary structure at least partially extending around the sleeve and including, a lower lip extending radially inward to retain a collar of the sleeve in an interior portion of the auxiliary structure, an upper stop, and a lower stop limiting axial movement of a head of the stud positioned in an interior portion of the auxiliary structure, and a stud extending through the crown opening and including a threaded section engaging with an interior threaded section in at least one of the collet body and the sleeve.

In another aspect, a fastener system is provided that includes a sleeve including a sleeve opening, a collet body at least partially enclosed within the sleeve, the collet body including, a crown having a crown opening, and a cantilever leg extending from the crown and including a foot configured to mate with the sleeve opening when the fastener system is in an engaged configuration, and a stud extending through the crown opening and including a threaded section engaging with an interior threaded section in at least one of the collet body and the sleeve, where a bushing is coupled to a distal end of the stud or the stud includes an expanded diameter section at the distal end of the stud, and where the bushing or the expanded diameter section of the stud radially expand the cantilever leg when the stud is threaded into the interior threaded section in at least one of the collet body and the sleeve.

In any of the aspects or combinations of the aspects, the sleeve may include the interior threaded section.

In any of the aspects or combinations of the aspects, the stud may include a reduced diameter section positioned below the threaded section.

In any of the aspects or combinations of the aspects, an axial length of the reduced diameter section on the stud may be equal to or greater than an axial length of the interior threaded section of the sleeve.

In any of the aspects or combinations of the aspects, the collet body may include the interior threaded section.

In any of the aspects or combinations of the aspects, the first cantilever leg may include an outer surface in contact with an inner surface of the sleeve when the fastener system is in the engaged configuration.

In any of the aspects or combinations of the aspects, the fastener system may further include a bushing coupled to an end of the stud.

In any of the aspects or combinations of the aspects, a head of the stud may be positioned external to a central aperture in the sleeve when the fastener system is in the engaged configuration.

In any of the aspects or combinations of the aspects, when the fastener system is in the engaged configuration, a lower surface of a head of the stud may be in contact with an upper structure.

In any of the aspects or combinations of the aspects, when the fastener system in the engaged configuration, an upper surface of the foot may be in contact with a lower structure.

In any of the aspects or combinations of the aspects, the first cantilever leg may bend radially inward in a neutral position.

In any of the aspects or combinations of the aspects, the sleeve may include a facetted collar spaced away from the sleeve opening.

In any of the aspects or combinations of the aspects, in a disengaged configuration the plurality of cantilever legs may be in neutral positions and in the engaged configuration the plurality of cantilever legs are in tensioned positions.

In any of the aspects or combinations of the aspects, advancing engagement between the threaded section of the stud and the interior threaded section may decrease a distance between an upper clamping surface and a lower clamping surface and where the lower clamping surface may be included in the feet and the upper clamping surface is included in the stud.

In any of the aspects or combinations of the aspects, the fastener system may further include an auxiliary structure at least partially extending around the sleeve.

In any of the aspects or combinations of the aspects, advancing engagement between the threaded section of the stud and the interior threaded section may decrease a distance between an upper clamping surface and a lower clamping surface and where the lower clamping surface may be include the feet and the upper clamping surface is included in the auxiliary structure.

In any of the aspects or combinations of the aspects, the auxiliary structure may include an upper stop and a lower stop limiting axial movement of a head of the stud positioned in an opening of the auxiliary structure.

In any of the aspects or combinations of the aspects, the auxiliary structure may include a stop having an inner diameter that is greater than an outer diameter of the threaded section of the stud and less than a diameter of a head of the stud.

In any of the aspects or combinations of the aspects, the auxiliary structure may include a lower lip extending radially inward to retain a collar of the sleeve in an interior portion of the auxiliary structure.

In any of the aspects or combinations of the aspects, where threading the threaded section of the stud into the interior threaded may include rotating the stud to apply an outward radially force on the cantilever legs and place the fastener system in an engaged configuration where the feet extend radially outward from the plurality of openings.

In any of the aspects or combinations of the aspects, mating the feet of the plurality of cantilever legs in the collet body with the plurality of openings in the sleeve may include inwardly bending the feet of the plurality of cantilever legs, and axially inserting the collet body into a central aperture in the sleeve.

In any of the aspects or combinations of the aspects, the method may further include unthreading the threaded section of the stud from the interior threaded section and freely rotating the stud within the collet body and the sleeve.

In any of the aspects or combinations of the aspects, the method may further include, prior to threading the threaded section into the interior threaded section and subsequent to mating the feet with the plurality of openings, attaching a bushing to an end of the stud.

In any of the aspects or combinations of the aspects, the stud may include a reduced diameter section positioned above the threaded section of the stud and where the threaded section has a larger diameter than the reduced diameter section is and is positioned closer to an end of the stud spaced away from a head of the stud.

In any of the aspects or combinations of the aspects, the fastener system may further include a locking ring positioned in a central aperture of the sleeve and at least partially circumferentially surrounding the stud and where the locking ring limits axial movement of the stud.

In any of the aspects or combinations of the aspects, the collet body may include a slit circumferentially positioned between two of the plurality of cantilever legs.

In any of the aspects or combinations of the aspects, the collet body may include a slit circumferentially positioned between the first cantilever leg and a second cantilever leg included in the collet body In any of the aspects or combinations of the aspects, the stud may include a reduced diameter section positioned above the threaded section of the stud and where the threaded section has a larger diameter than the reduced diameter section is and is positioned closer to an end of the stud spaced away from a head of the stud and where the reduced diameter section threadingly engages with the interior threaded section in the sleeve.

In any of the aspects or combinations of the aspects, the collet body may include a slit circumferentially positioned between two of the plurality of cantilever legs.

In any of the aspects or combinations of the aspects, the stud may include a reduced diameter section adjacent to the threaded section of the stud and where the stud freely rotates when the reduced diameter section is aligned with the interior threaded section in at least one of the collet body and the sleeve.

Note that the example control and estimation routines included herein can be used with various fastener system configurations. The control methods and routines disclosed herein may be stored as executable instructions in non-transitory memory and may be carried out by a tooling apparatus.

The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the fastener system and/or tooling apparatus, where the described actions are carried out by executing the instructions in a tooling apparatus and fastener system including the various components.

It will be appreciated that the configurations and routines disclosed herein are exemplary in nature, and that these specific embodiments are not to be considered in a limiting sense, because numerous variations are possible. For example, the above technology can be applied to a broad range of manufacturing fields such as the aerospace industry, the construction industry, the maritime industry, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fastener system comprising:
a sleeve including a sleeve opening;
a collet body at least partially enclosed within the sleeve, the collet body including:
a crown having a crown opening; and
a first cantilever leg extending from the crown and including a foot configured to mate with the sleeve opening when the fastener system is in an engaged configuration; and
a stud extending through the crown opening and including a threaded section engaging with an interior threaded section in at least one of the collet body and the sleeve;
where the sleeve opening includes a lower side that is positioned below a lower surface of the foot;
where the sleeve includes the interior threaded section;
where the stud includes a reduced diameter section positioned below the threaded section; and
where an axial length of the reduced diameter section of the stud is equal to or greater than an axial length of the interior threaded section of the sleeve.

2. The fastener system of claim 1, where the first cantilever leg includes an outer surface in contact with an inner surface of the sleeve when the fastener system is in the engaged configuration.

3. The fastener system of claim 1, further comprising a bushing coupled to an end of the stud.

4. The fastener system of claim 1, where a head of the stud is positioned external to a central aperture in the sleeve when the fastener system is in the engaged configuration and when the fastener system is in the engaged configuration, a lower surface of the head of the stud is in contact with an upper structure.

5. The fastener system of claim 4, where, when the fastener system is in the engaged configuration, an upper surface of the foot is in contact with a lower structure.

6. The fastener system of claim 1, where the first cantilever leg extends radially inward in a neutral position.

7. A fastener system comprising:
a sleeve including a plurality of sleeve openings;
a collet body including:
    a crown having a crown opening; and
    a plurality of cantilever legs extending from the crown, each of the plurality of cantilever legs including a foot configured to mate with one of the plurality of sleeve openings when the fastener system is in an engaged configuration; and
a stud extending through the crown opening and including a threaded section engaging with an interior threaded section in the sleeve;
where, in the engaged configuration, the stud exerts an outward force on the plurality of cantilever legs to push a portion of each of the feet outside of the corresponding sleeve opening;
where each of the plurality of sleeve openings include an upper side, a lower side, and opposing lateral sides that extend around an upper surface, a lower surface, and opposing side surfaces of the corresponding foot; and
where the collet body includes a crown sized to mate with a central aperture in the sleeve that extends to a distal end of the sleeve.

8. The fastener system of claim 7, where, in a disengaged configuration, the plurality of cantilever legs are in neutral positions and, in the engaged configuration, the plurality of cantilever legs are in tensioned positions.

9. A fastener system comprising:
a sleeve including a sleeve opening;
a collet body at least partially enclosed within the sleeve, the collet body including:
    a crown having a crown opening; and
    a cantilever leg extending from the crown and including a foot configured to mate with the sleeve opening when the fastener system is in an engaged configuration; and
a stud extending through the crown opening and including a threaded section engaging with an interior threaded section in at least one of the collet body and the sleeve;
where a bushing is coupled to a distal end of the stud or the stud includes an expanded diameter section at the distal end of the stud;
where the bushing or the expanded diameter section of the stud radially expand the cantilever leg when the stud is threaded into the interior threaded section in at least one of the collet body and the sleeve;
where each of the plurality of sleeve openings include an upper side, a lower side, and opposing lateral sides that extend around an upper surface, a lower surface, and opposing side surfaces of the corresponding foot;
where the collet body includes a crown with an outer diameter that is smaller than a diameter of an inner surface of the sleeve; and
where the crown of the collet body is spaced away from a head of the stud when the fastener system is in the engaged configuration.

10. The fastener system of claim 9, where the stud includes a reduced diameter section adjacent to the threaded section of the stud and where the stud freely rotates when the reduced diameter section is aligned with the interior threaded section in at least one of the collet body and the sleeve.

* * * * *